(12) United States Patent
Learned

(10) Patent No.: US 10,299,281 B2
(45) Date of Patent: May 21, 2019

(54) COGNITIVE RADIO METHOD AND APPARATUS FOR ACHIEVING AD HOC INTERFERENCE MULTIPLE ACCESS WIRELESS COMMUNICATION

(71) Applicant: Massachusetts Institute of Technology, Cambridge, MA (US)

(72) Inventor: Rachel E. Learned, Waltham, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 140 days.

(21) Appl. No.: 15/317,750

(22) PCT Filed: Jun. 16, 2015

(86) PCT No.: PCT/US2015/035963
§ 371 (c)(1),
(2) Date: Dec. 9, 2016

(87) PCT Pub. No.: WO2016/053406
PCT Pub. Date: Apr. 7, 2016

(65) Prior Publication Data
US 2017/0118762 A1 Apr. 27, 2017

Related U.S. Application Data

(63) Continuation-in-part of application No. 14/585,780, filed on Dec. 30, 2014, now Pat. No. 9,699,665.
(Continued)

(51) Int. Cl.
*H04L 1/00* (2006.01)
*H04W 24/00* (2009.01)
(Continued)

(52) U.S. Cl.
CPC ............. *H04W 72/082* (2013.01); *H04L 1/00* (2013.01); *H04W 24/00* (2013.01); *H04W 24/02* (2013.01); *H04W 28/18* (2013.01); *H04W 84/18* (2013.01)

(58) Field of Classification Search
CPC ... H04W 72/082; H04W 24/02; H04W 24/00; H04W 28/18; H04W 84/18; H04L 1/00
See application file for complete search history.

(56) References Cited

U.S. PATENT DOCUMENTS 6,487,414 B1  11/2002 Tanay et al.
6,704,376 B2   3/2004 Mills et al.
(Continued)

FOREIGN PATENT DOCUMENTS

WO   WO 2010/066289 A1   6/2010
WO   WO 2011/006116 A1   1/2011
(Continued)

OTHER PUBLICATIONS

Office Action dated Nov. 15, 2017 from U.S. Appl. No. 15/618,848; 18 Pages.
(Continued)

*Primary Examiner* — Van O Latorre
(74) *Attorney, Agent, or Firm* — Daly, Crowley, Mofford & Durkee LLP

(57) ABSTRACT

In a radio network having a plurality of first users on channel (FUOCs) and one or more second users on channel (SUOCs), a method and apparatus for a SUOC to select a channel to co-occupy based upon a "selfish" goal of achieving a desired SUOC rate and an "altruistic" goal of causing low-impact on the FUOC. A SUOC collects signal parameters for a plurality of FUOCs, orders the FUOCs based upon different criteria, and attempts to co-exist with FUOCs until a suitable FUOC channel is found.

11 Claims, 20 Drawing Sheets

Related U.S. Application Data

(60) Provisional application No. 62/012,672, filed on Jun. 16, 2014.

(51) Int. Cl.
*H04W 24/02* (2009.01)
*H04W 28/18* (2009.01)
*H04W 72/08* (2009.01)
*H04W 84/18* (2009.01)

(56) References Cited

U.S. PATENT DOCUMENTS

| | | |
|---|---|---|
| 6,947,505 B2 | 9/2005 | Learned |
| 7,031,266 B1 | 4/2006 | Patel et al. |
| 7,058,422 B2 | 6/2006 | Learned et al. |
| 7,085,575 B2 | 8/2006 | Fabien et al. |
| 7,092,452 B2 | 8/2006 | Taylor et al. |
| 7,126,890 B2 | 10/2006 | Learned et al. |
| 7,190,743 B2 | 3/2007 | Learned |
| 7,218,690 B2 | 5/2007 | Learned |
| 7,269,223 B2 | 9/2007 | Learned et al. |
| 7,558,238 B1 | 7/2009 | Sun et al. |
| 7,593,473 B2 | 9/2009 | Learned et al. |
| 7,593,492 B1 | 9/2009 | Lande |
| 7,724,851 B2 | 5/2010 | Learned et al. |
| 7,738,906 B2 | 6/2010 | Attar et al. |
| 7,787,553 B2* | 8/2010 | Prasad .............. H04L 25/03006 375/259 |
| 8,218,450 B2 | 7/2012 | Aoyama et al. |
| 9,148,804 B2 | 9/2015 | Learned |
| 2001/0028675 A1 | 10/2001 | Bierly et al. |
| 2002/0002052 A1 | 1/2002 | McHenry |
| 2002/0122413 A1 | 9/2002 | Shoemake |
| 2003/0139196 A1* | 7/2003 | Medvedev ........... H04B 7/0443 455/522 |
| 2004/0018843 A1 | 1/2004 | Cerwall et al. |
| 2004/0082363 A1* | 4/2004 | Hosein ................. H04W 28/18 455/560 |
| 2004/0235472 A1 | 11/2004 | Fujishima et al. |
| 2005/0124347 A1 | 6/2005 | Hosein |
| 2005/0201280 A1 | 9/2005 | Lundby et al. |
| 2005/0282550 A1* | 12/2005 | Cho ..................... H04W 72/10 455/447 |
| 2006/0193294 A1 | 8/2006 | Jorswieck et al. |
| 2008/0089279 A1 | 4/2008 | Hu et al. |
| 2008/0198828 A1 | 8/2008 | Reznik et al. |
| 2008/0293353 A1 | 11/2008 | Mody et al. |
| 2009/0154534 A1 | 6/2009 | Hassan |
| 2009/0190566 A1 | 7/2009 | Kwon et al. |
| 2009/0258597 A1 | 10/2009 | Chen et al. |
| 2009/0291640 A1* | 11/2009 | Bhattad ............. H04W 72/0406 455/63.1 |
| 2010/0124930 A1 | 5/2010 | Andrews et al. |
| 2010/0142465 A1* | 6/2010 | Medepalli ........... H04W 72/085 370/329 |
| 2010/0165956 A1 | 7/2010 | Razzell |
| 2010/0289688 A1 | 11/2010 | Sherman et al. |
| 2010/0304770 A1 | 12/2010 | Wietfeldt et al. |
| 2011/0002411 A1 | 1/2011 | Forenza et al. |
| 2011/0021153 A1 | 1/2011 | Safavi |
| 2011/0093540 A1 | 4/2011 | Eisenberg et al. |
| 2011/0176508 A1* | 7/2011 | Altintas ............... H04W 72/085 370/329 |
| 2011/0205929 A1* | 8/2011 | Quek .................... H04W 16/30 370/252 |
| 2011/0286351 A1* | 11/2011 | Reudink ............... H04W 16/10 370/252 |
| 2012/0039183 A1 | 2/2012 | Barbieri et al. |
| 2012/0069941 A1 | 3/2012 | Herbig |
| 2012/0071102 A1 | 3/2012 | Palomar et al. |
| 2012/0108276 A1 | 5/2012 | Lang et al. |
| 2012/0208571 A1 | 8/2012 | Park et al. |
| 2013/0035108 A1 | 2/2013 | Joslyn et al. |
| 2013/0244681 A1 | 9/2013 | Ookubo et al. |
| 2014/0105136 A1* | 4/2014 | Tellado ................ H04L 5/0058 370/329 |
| 2014/0293867 A1 | 10/2014 | Horiuchi et al. |
| 2014/0314003 A1 | 10/2014 | Zhou et al. |
| 2014/0348004 A1 | 11/2014 | Ponnuswamy |
| 2015/0049721 A1 | 2/2015 | Wijting et al. |
| 2015/0282176 A1 | 10/2015 | MacLeod et al. |
| 2015/0282189 A1 | 10/2015 | Learned et al. |
| 2015/0311971 A1 | 10/2015 | Learned et al. |
| 2018/0367207 A1* | 12/2018 | Learned ............... H04W 24/08 |

FOREIGN PATENT DOCUMENTS

| | | |
|---|---|---|
| WO | WO 2011/055319 A1 | 5/2011 |
| WO | WO 2016/114844 A2 | 7/2016 |

OTHER PUBLICATIONS

U.S. Appl. No. 15/618,848, filed Jun. 9, 2017, Learned, et al.
U.S. Notice of Allowance dated Mar. 22, 2017 corresponding to U.S. Appl. No. 14/585,780; 14 Pages.
Request for Continued Examination (RCE) and Response to Final Office Action dated Sep. 12, 2017 for U.S. Appl. No. 15/618,848; RCE and Response filed on Feb. 12, 2018; 20 Pages.
U.S. Appl. No. 14/867,687, filed Sep. 28, 2015, Learned.
U.S. Appl. No. 14/585,780, filed Dec. 30, 2014, Learned.
Ahmed, et al.; "Entropy Expressions and Their Estimators for Multivariate Distributions;" IEEE Transactions on Information Theory; vol. 35; No. 3; May 1989; 5 Pages.
Bahl, et al.; "Optimal Decoding of Linear Codes for Minimizing Symbol Error Rate;" IEEE Transactions on Information Theory; Mar. 1974; 4 Pages.
Learned; "Making Optimal Use of the Asymmetric Inference Channel;" IEEE; Signals, Systems and Computers (Asilomar); Nov. 6-9, 2011; 6 Pages.
Learned; "Making Optimal Use of the Asymmetric Interference Channel;" Asilomar Conference on Signals, Systems, and Computing; Presentation; Nov. 8, 2011; 63 Pages.
Neeser, et al.; "Proper Complex Random Processes with Applications to Information Theory;" IEEE Transactions on Information Theory; vol. 39; No. 4; Jul. 1993; 10 Pages.
Pham; "Fast Algorithms for Mutual Information Based Independent Component Analysis;" IEEE Transactions on Signal Processing; vol. 52; No. 10; Oct. 2004; 11 Pages.
Tufts; "Design Problems in Pulse Transmission;" Technical Report 368; Massachusetts Institute of Technology; Jul. 28, 1960; 52 Pages.
Tufts; "Nyquist's Problem—The Joint Optimization of Transmitter and Receiver in Pulse Amplitude Modulation;" Proceedings of the IEEE: vol. 53; Issue 3; 12 Pages.
Ungerboeck; "Channel Coding with Multilevel/Phase Signals;" IEEE Transactions on Information Theory; vol. IT-28; No. 1; Jan. 1982; 13 Pages.
Verdu; "The Capacity Region of the Symbol-Asynchronous Gaussian Multiple-Access Chanel;" IEEE Transactions on Information Theory; vol. 35; No. 4; Jul. 1989; 19 Pages.
PCT International Search Report and Written Opinion for Appl. No. PCT/US2013/031900 dated Jan. 15, 2014; 12 Pages.
PCT International Preliminary Report on Patentability of the ISA for Appl. No. PCT/US2013 031900 dated May 21, 2015; 9 Pages.
PCT International Search Report and Written Opinion for Appl. No. PCT/US2013/68710 dated Jan. 7, 2014; 15 Pages.
PCT International Preliminary Report on Patentability of the ISA for Appl. No. PCT/US2013/068710 dated May 21, 2015; 9 Pages.
PCT International Search Report and Written Opinion for Appl. No. PCT/US2013/47026 dated Jun. 21, 2013; 16 Pages.
PCT International Preliminary Report on Patentability of the ISA dated Sep. 24, 2015 for Appl. No. PCT/US2013/047026; 11 Pages.
PCT International Search Report and Written Opinion dated Feb. 26, 2016 for PCT International Application No. PCT/US2015/035963; 11 Pages.
PCT International Search Report and Written Opinion dated Jul. 15, 2016 corresponding to International Application No. PCT/US2015/058586; 12 Pages.

(56) References Cited

OTHER PUBLICATIONS

Office Action dated Feb. 4, 2015 for U.S. Appl. No. 13/998,566; 9 Pages.
Response to Office Action dated Feb. 4, 2015 corresponding to U.S. Appl. No. 13/998,566; Response filed on May 4, 2015; 8 Pages.
Notice of Allowance dated Jun. 8, 2015 for U.S. Appl. No. 13/998,566; 17 Pages.
U.S. Restriction Requirement dated Aug. 16, 2016 corresponding to U.S. Appl. No. 14/437,350; 7 Pages.
Response to Restriction Requirement dated Aug. 16, 2016 for U.S. Appl. No. 14/437,350; Response filed on Sep. 12, 2016; 1 Page.
U.S. Office Action dated Sep. 29, 2016 corresponding to U.S. Appl. No. 14/437,350; 8 Pages.
U.S. Office Action dated Oct. 12, 2016 corresponding to U.S. Appl. No. 14/648,049; 33 Pages.
U.S. Restriction Requirement dated Nov. 9, 2016 corresponding to U.S. Appl. No. 14/437,882; 7 Pages.
Response to Restriction Requirement dated Nov. 9, 2016 corresponding to U.S. Application No. 14/437,882; Response filed on Nov. 29, 2016; 1 Page.
Office Action dated Sep. 9, 2016, for U.S. Appl. No. 14/585,780; 27 pages.
Response to U.S. Office Action dated Sep. 9, 2016 corresponding to U.S. Appl. No. 14/585,780; Response filed Dec. 7, 2016; 6 Pages.
U.S. Office Action dated Jan. 5, 2017 corresponding to U.S. Appl. No. 14/437,882; 11 Pages.
PCT International Preliminary Report dated Dec. 29, 2016 corresponding to International Application No. PCT/US2015/035963; 7 Pages.
Response to Office Action dated Sep. 29, 2016 corresponding to U.S. Appl. No. 14/437,350; Response filed on Dec. 19, 2016; 8 Pages.
Response to U.S. Non-Final Office Action dated Jan. 5, 2017 for U.S. Appl. No. 14/437,882; Response filed on Jan. 31, 2017; 13 Pages.
Response to U.S. Non-Final Office Action dated Oct. 12, 2016 for U.S. Appl. No. 14/648,049; Response filed on Jan. 31, 2017; 13 Pages.
Final Office Action dated Sep. 12, 2017 from U.S. Appl. No. 14/648,049; 43 Pages.
Notice of Allowance dated Apr. 4, 2017 for U.S. Appl. No. 14/437,882; 11 Pages.
Preliminary Amendment filed May 4, 2018 for U.S. Appl. No. 15/618,848; 14 Pages.
U.S. Final Office Action dated May 7, 2018 for U.S. Appl. No. 15/618,848; 11 Pages.
Notice of Allowance dated Mar. 17, 2017 for U.S. Appl. No. 14/437,350; 10 Pages.
Notice of Allowance dated Mar. 27, 2018 for U.S. Appl. No. 14/648,049; 9 Pages.
PCT International Preliminary Report on Patentability of the ISA dated May 18, 2017 from International App. No. PCT/US2015/058586; 6 Pages.
Office Action for U.S. Appl. No. 14/648,049 dated Apr. 14, 2017; 35 pages.
Response to Office Action dated Apr. 14, 2017 as filed on Jul. 14, 2017 from U.S. Appl. No. 14/648,049; 17 Pages.
Response to Office Action dated Aug. 27, 2018 for U.S. Appl. No. 15/522,844, filed Sep. 14, 2018; 5 pages.
Notice of Allowance dated Oct. 12, 2018 for U.S. Appl. No. 15/522,844; 11 pages.
Notice of Allowance dated Aug. 2, 2018 for U.S. Appl. No. 15/618,848; 9 Pages.
Office Action dated Aug. 27, 2018 for U.S. Appl. No. 15/522,844; 21 Pages.
Response to Final Office Action dated May 7, 2018 for U.S. Appl. No. 15/618,848, filed Jul. 23, 2018; 8 Pages.
Request for Continued Examination (RCE) and Response to Final Office Action dated Sep. 17, 2017 for U.S. Appl. No. 14/648,049, filed Feb. 12, 2018; 20 pages.

\* cited by examiner

Example Settling Episode Progression Using a Power List

1. Start probing with lowest power level on the list: power level = Min Power
2. FUOC signal made no changes perceptible to SUOC receiver
3. Determine Next Power by moving up the list one entry: power level = Power Lv. 2
4. FUOC signal made no changes perceptible to SUOC receiver
5. Determine Next Power by moving up the list one entry: power level = Power Lv. 3
6. FOUC signal has been observed by SUOC receiver to have changed
7. Fallback: This is the power level that is "settled" upon for communication state
   - Settled power level = Power Lv. 2
   - Note that the number of FUOC moves before a fallback is a parameter set within unit 400 either done prior to radio deployment and/or updated during operation by a control decision made within the SUOC radio.

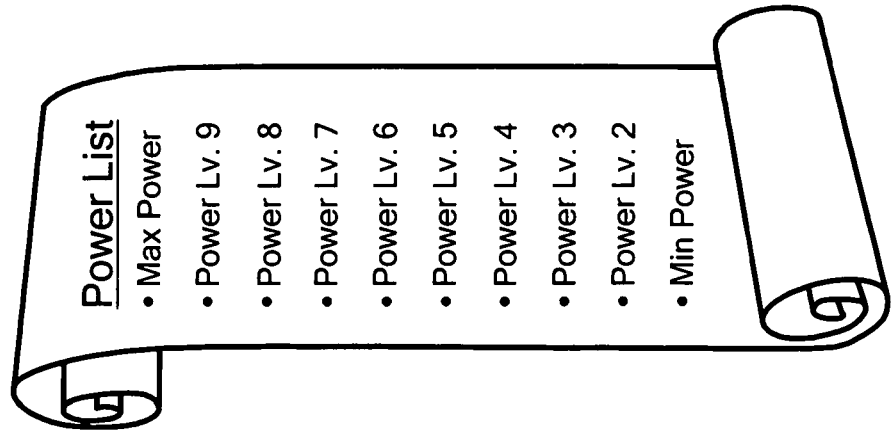

Power List
- Max Power
- Power Lv. 9
- Power Lv. 8
- Power Lv. 7
- Power Lv. 6
- Power Lv. 5
- Power Lv. 4
- Power Lv. 3
- Power Lv. 2
- Min Power

*FIG. 8*

COGNITIVE RADIO METHOD AND APPARATUS FOR ACHIEVING AD HOC INTERFERENCE MULTIPLE ACCESS WIRELESS COMMUNICATION

CROSS REFERENCE TO RELATED APPLICATION

This application is a U.S. National Stage of PCT Application No. PCT/US2015/035963 filed in the English language on Jun. 16, 2015, and entitled "COGNITIVE RADIO METHOD AND APPARATUS FOR ACHIEVING AD HOC INTERFERENCE MULTIPLE ACCESS WIRELESS COMMUNICATION," which claims the benefit of a continuation-in-part of co-pending U.S. application Ser. No. 14/585,780 filed Dec. 30, 2014, which claims the benefit under 35 U.S.C. § 119(e) of U.S. Provisional Application No. 62/012,672 filed Jun. 16, 2014, each application incorporated herein by reference in its entirety.

STATEMENT REGARDING FEDERALLY SPONSORED RESEARCH

This invention was made with Government support under Contract No. FA8721-05-C-0002 awarded by the U.S. Air Force. The Government has certain rights in the invention.

FIELD

The concepts described herein relate generally to wireless communication, and more particularly to cognitive radio systems and techniques for achieving wireless communications in the presence of interference.

BACKGROUND

As is known in the art, different wireless networks and/or systems of radios avoid interfering with each other by various options. For example, some systems rely on pre-arrangement or careful assignment of frequency bands, time slots, or signature pulses as is done for cellular systems through frequency reuse maps and time division multiple access (TDMA) for global system for mobile communications (GSM), orthogonal frequency division multiple access (OFDMA) for long term evolution (LTE), spread spectrum for IS-95, and combinations of these for wavelength carrier division multiple access (WCDMA) through HSPA commercial cellular standards. Other systems utilize collision avoidance techniques such as those employed for a-packet based systems such as IEEE 802.11/16/22 (WiFi and WiMax) where collisions are controlled as part of a multiple access medium access control procedure (e.g. carrier sense multiple access). Still other systems utilize so-called "on the fly" interference assessment and avoidance is used in operational paradigm for "cognitive radio" via dynamic spectrum access (DSA) for the newly allowed "secondary" user (see IEEE SCC41: Standards for Dynamic Spectrum Access Networks). This is done by the system of so-called "secondary user" radios actively sensing the radio spectrum and coordinating to choose an unused or empty band for transmission.

The existing systems, however, all fail if they are unable to avoid interference.

As the consumer market continues to rise for smart phones and wireless data service, the demand for more and more throughput increases drastically and the associated radio spectrum continues to become more crowded. A new paradigm in wireless communication is emerging where radios can be built to withstand interference to the level where interference is no longer avoided. Interference is allowed, even invited, to allow for more wireless devices to make use of the scarce free space in the wireless spectrum. For example, the LTE Advanced standard (to support heterogeneous HetNet network) allows, even encourages, interference. If a HetNet feature is enabled, reliable performance requires mobile devices to have some kind of interference mitigation in the receivers.

Conventional cognitive networks typically adapt at a network/routing layer, rather than a physical layer. Such networks typically "learn" which network nodes are having trouble sending packets through them and then they start to change how they route the packets. This conventional type of cognitive network does not invite or encourage interference; it simply does the best it can to avoid using links that are hindered by interference.

SUMMARY

The subject of this invention, in contrast, purposely seeks out opportunities to create interference, but to do so in an intelligent way that takes advantage of the situation and device protocols and capabilities at hand along with making use of advanced processing and sensing technology so as to enable high throughputs for its own link as well as the link with which it simultaneously shares the band.

As used herein, the phrases "coexistence cognitive radio" and "cognitive coexistence radio" generally refer to a wireless communication system that is "aware" of its surrounding environment (i.e., outside world), senses the RF environment to which it is exposed, computes feature parameters from sensed RF signals, makes decisions based upon calculations involving the RF features along with learned features acquired from gained understanding of the environment's behavior in reaction to emissions from the cognitive coexistence radio. Further, the cognitive coexistence radio adapts its internal states to sensed variations in the RF signals transmitted by others in the environment and makes corresponding changes in certain operating parameters (e.g., transmit-power, carrier-frequency, and modulation strategy) in real-time to have a desired effect upon the emitting devices and their corresponding links as well as a desired effect upon its own link. Often, such changes are made with two primary objectives in mind: (1) to provide highly reliable communications whenever and wherever needed; and (2) to provide efficient utilization of the radio spectrum. Networks which include such coexistence cognitive radios are referred to herein as cognitive networks.

The concepts, systems, circuits and techniques described herein find use in a wide variety of application areas including, but not limited to wireless communication such as that provided by the 4G (LTE) cellular, 802.11 (WiFi), or 802.16 (WiMax) wireless standard and equipment. Since wireless communications with MIMO (multiple input, multiple output) receiver algorithms may be similar mathematically to MUD algorithms, the concepts, systems and techniques described herein may be applied to radios that employ MIMO transmission/reception schemes. Furthermore, the concepts, systems and techniques described herein may be applied to systems and techniques for storage on magnetic media (e.g. since magnetic storage readers "see" adjacent tracks in addition to the tracks they are trying to read). This adjacent track interference is mathematically similar to the interference referred to herein as a FUOC signal. Further still, the concepts, systems and techniques described herein may be applied to signals propagating on a cable (e.g. since receivers closer to a transmitting hub station receive a stronger signal than receivers farther away from the hub station and thus the closer receivers can "see" embedded interfering signals in the presence of the stronger signal that was actually meant for the receivers that are farther away from the transmitting hub.)

It should be appreciated that, in general, the concepts, systems and techniques described herein allow different wireless networks and/or radios to coexist in the same frequency band at the same time, causing interference with one another (i.e. they will interfere on purpose) without different providers and mobile nodes having to conform to a single waveform or coordination-enabling protocol. The different interfering networks/systems do not require pre-specified coordination/cooperation protocols or means of direct communication with each other to negotiate a satisfactory sharing of the same band.

The concepts, systems and techniques described herein enable backward compatible operation with radios that do not possess the capabilities of this invention, where the older radios would maintain high functionality in the presence of the impeded "spectrum share."

In accordance with one aspect of the disclosure, in a radio network having a plurality of first users on channel (FUOCs) and one or more second users on channel (SUOCs), a method comprises: (a) identifying a plurality of FUOCs, each of the plurality of FUOCs operating in a respective FUOC channel; (b) for each of the plurality of FUOCs, determining if the SUOC can achieve a desired SUOC rate co-existing in the FUOC's channel; (c) for each of the plurality of FUOCs, determining an expected impact upon the FUOC if the SUOC were to co-exist in the FUOC's channel; (d) assigning each one of the FUOCs to one of a plurality of groups based, at least in part, upon whether the SUOC can achieve the desired SUOC rate co-existing in the FUOC's channel and the expected impact upon the FUOC if the SUOC were to co-exist in the FUOC's channel; (e) generating an ordered list of FUOCs from the plurality of groups; and (f) selecting a FUOC from the ordered list of FUOCs.

In some embodiments, the method further comprises: (g) operating in the selected FUOC's channel; (h) determining an actual impact on a selected FUOC in response to operating in the selected FUOC's channel; and (i) determining if the actual impact on the selected FUOC is acceptable; and (j) if the actual impact on the selected FUOC is not acceptable, selecting another FUOC from the ordered list of FUOCs.

In certain embodiments, determining the expected impact upon the FUOC if the SUOC were to co-exist in the FUOC's channel comprises: determining an actual FUOC rate and an possible FUOC rate; and comparing the actual FUOC rate to the possible FUOC rate. Determining if the SUOC can achieve a desired SUOC rate co-existing in the FUOC's channel may include: determining a desired SUOC rate; determine a possible SUOC rate based upon the actual FUOC rate; and comparing the desired SUOC rate to the possible SUOC rate.

In particular embodiments, assigning each one of the FUOCs to one of a plurality of groups comprises assigning each one of the FUOCs to one of a plurality of groups based upon the desired SUOC rate, the possible SUOC rate, the actual FUOC rate, and the possible FUOC rate. Assigning each one of the FUOCs to one of the plurality of groups may include: assigning a FUOC to a first group if a possible SUOC rate is greater than a desired SUOC rate; and assigning a FUOC to a second group if the possible SUOC rate less than the desired SUOC rate.

In some embodiments, assigning each one of the FUOCs to one of the plurality of groups comprises: assigning a FUOC to a first group if a possible SUOC rate is greater than a desired SUOC rate and if an actual FUOC rate is less than the difference of an possible FUOC rate and a first design parameter; assigning a FUOC to a second group if the possible SUOC rate is greater than the desired SUOC rate and if the actual FUOC rate is greater than the sum of the possible FUOC rate and a second design parameter; assigning a FUOC to a third group if the possible SUOC rate is greater than the desired SUOC rate, and if the actual FUOC rate is not less than less than the difference of an possible FUOC rate and a first design parameter, and if the actual FUOC rate is not greater than the sum of the possible FUOC rate and a second design parameter; assigning a FUOC to a fourth group if the possible SUOC rate is less than the desired SUOC rate and if the actual FUOC rate is less than the difference of the possible FUOC rate and a first design parameter; assigning a FUOC to a fifth group if the possible SUOC rate is less than the desired SUOC rate and if the actual FUOC rate is greater than the sum of the possible FUOC rate and a second design parameter; and assigning a FUOC to a sixth group if the possible SUOC rate is less than the desired SUOC rate, and if the actual FUOC rate is not less than less than the difference of an possible FUOC rate and a first design parameter, and if the actual FUOC rate is not greater than the sum of the possible FUOC rate and a second design parameter.

The groups may be ordered in any suitable manner. For example, in certain embodiments, generating an ordered list of FUOCs from a plurality of groups comprises: forming a list; adding FUOCs from the first group to the beginning of the list; adding FUOCs from the second group to the list, after FUOCs from the first group; adding FUOCs from the third group to the list, after FUOCs from the second group; adding FUOCs from the fourth group to the list, after FUOCs from the third group; adding FUOCs from the fifth group to the list, after FUOCs from the fourth group; and adding FUOCs from the sixth group to the list, after FUOCs from the fifth group. In other embodiments, generating an ordered list of FUOCs from a plurality of groups comprises: forming a list; adding FUOCs from the first group to the beginning of the list; adding FUOCs from the second group to the list, after FUOCs from the first group; adding FUOCs from the fourth group to the list, after FUOCs from the second group; adding FUOCs from the fifth group to the list, after FUOCs from the fourth group; adding FUOCs from the third group to the list, after FUOCs from the fifth group; and adding FUOCs from the sixth group to the list, after FUOCs from the third group.

In some embodiments, determining an actual FUOC rate and an possible FUOC rate comprises: receiving radio frequency (RF) signals transmitted by a FUOC; analyzing the received RF signals to determine signal parameters, the signal parameters including a received signal power and an actual FUOC rate; and deriving an possible FUOC rate based, at least in part, upon the received signal power and the actual FUOC rate.

In accordance with another aspect of the disclosure, a system in a network having one or more first users on a channel (FUOCs) and one or more second users on a channel (SUOCs) comprises a radio configured to: (a) identify a plurality of FUOCs, each of the plurality of FUOCs operating in a respective FUOC channel; (b) for each of the plurality of FUOCs, determine if the SUOC can achieve a desired SUOC rate co-existing in the FUOC's channel; (c) for each of the plurality of FUOCs, determine an expected impact upon the FUOC if the SUOC were to co-exist in the FUOC's channel; (d) assign each one of the FUOCs to one of a plurality of groups based, at least in part, upon whether the SUOC can achieve the desired SUOC rate co-existing in the FUOC's channel and the expected impact upon the FUOC if the SUOC were to co-exist in the FUOC's channel; (e) generate an ordered list of FUOCs from the plurality of groups; and (f) select a FUOC from the ordered list of FUOCs.

BRIEF DESCRIPTION OF THE DRAWINGS

The foregoing features of this invention, as well as the invention itself, may be more fully understood from the following description of the drawings in which:

FIG. 8 is an example of a use of a power list illustrating a step by step example of an outcome of each step of the list-based settling procedure as described in FIGS. 7 and 7A;

FIG. 9 is a flow diagram of a procedure to construct an ordered list of powers to step through;

DETAILED DESCRIPTION

Before describing a cognitive radio and related systems and techniques, some introductory concepts and terminology are explained. Communicating data from one location to another requires some form of pathway or medium between the two locations. In telecommunications and computer networking, a communication channel, or more simply "a channel," refers to a connection between two locations over a transmission medium. The connection may, for example, be a logical connection and the transmission medium may be, for example, a multiplexed medium such as a radio channel. A channel is used to convey an information signal, for example a digital bit stream, from one or several source or sending nodes (or more simply "sources" or "transmitters") to one or several destination or receiving nodes (or more simply "destinations" or "receivers"). Regardless of the particular manner or technique used to establish a channel, each channel has a certain capacity for transmitting information, often measured by its frequency bandwidth in Hz or its data rate in bits per second. The concepts, systems and techniques described find application in a wide variety of applications including, but not limited to: satellite communications (SATCOM), as well as with optical communications, wired communications (e.g. communications over a cable or other type of wire) and magnetic storage applications.

A coexistence cognitive radio and related techniques as described herein are capable of assessing a frequency spectrum, determining candidate frequency bands in which other independent radios are already operating, and successfully sharing access of an already occupied frequency band with an independent radio system. The subject coexistence cognitive radios successfully transmit and receive in the pre-occupied band without detrimental harm to the pre-existing radio system that was already operating in that band. Moreover, the pre-existing radio system already operating in that band requires no additional capabilities to coexist with the subject system. Specifically, the pre-existing radio system is not expected to communicate with the coexistence cognitive radio described herein to accomplish a virtual negotiation to settle upon an agreeable coexistence of the two systems.

Figure 1:
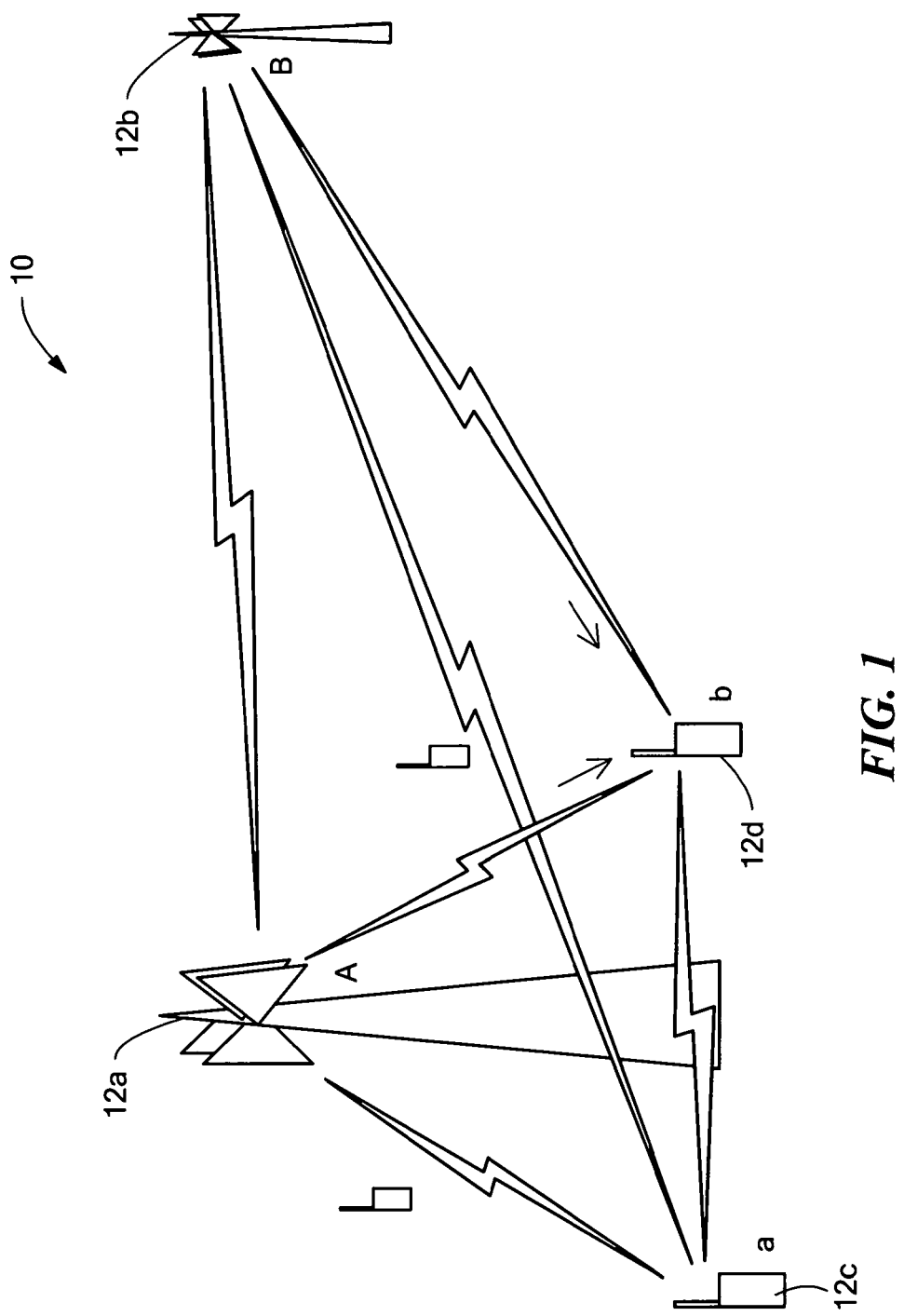
FIGS. 1 and 2 are diagrams illustrating various operational scenarios of a cognitive radio system.
Figure 2:
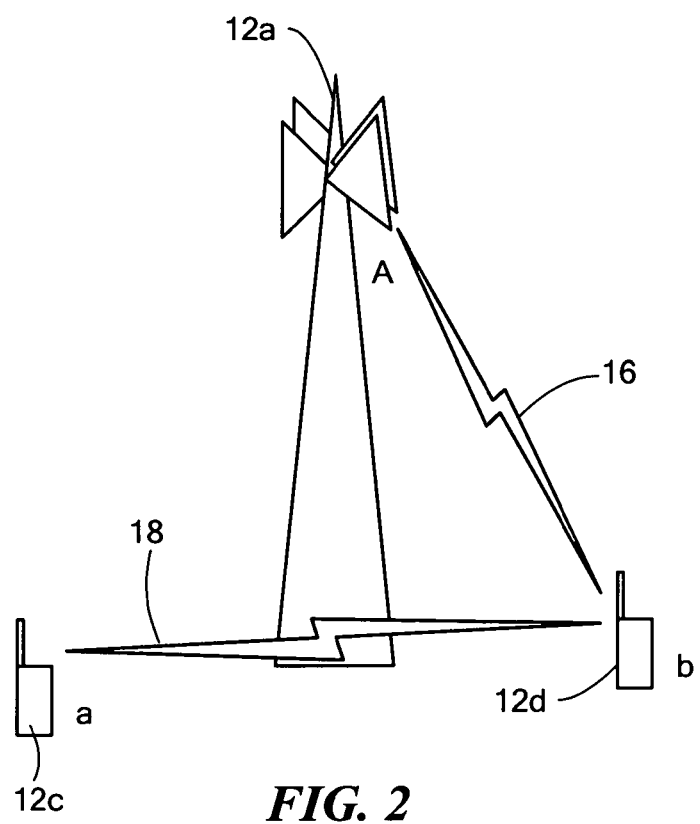

Referring now to FIGS. 1 and 2 in which like elements are provided having like reference designations, a network 10 is shown to include a plurality of nodes, here four nodes designated as Node A (12a), Node B (12b), Node a (12c), and Node b (12d). Those of ordinary skill in the art will appreciate, of course, that the network may include any number of nodes with four nodes here being shown to promote clarity in the drawings and written description of the broad concepts described herein.

A First User On Channel (FUOC) begins to transmit from Node A to Node B in a free-and-clear channel. Thus, this channel is now "occupied."

A Second User On Channel (SUOC) operates with a coexistence cognitive radio (also sometimes referred to herein as a SUOC radio) and wants to communicate between Node a and Node b. By definition, a SUOC user intends to find and co-occupy the same frequency band at the same time as a FUOC user. The concepts, systems, and techniques described herein focus on the SUOC user making use of the frequency band already occupied by links BA and AB (i.e. the SUOC is making use of an already occupied band).

The FUOC radio system (e.g., the communication system at Node A) possesses the means to adapt to the radio frequency (RF) environment in which it is operating. Alternatively, the FUOC system can possess cognitive radio ability and thus is able to sense the environment in which it wishes to operate, adapt to that environment, and/or even learn and/or predict what to do to robustly operate within the environment at hand. Alternatively still, the FUOC system can include a coexistence cognitive radio as described herein that happened to choose a free and clear channel to occupy.

The SUOC radio system (e.g., the communication system at Node A) chooses an occupied channel over which to communicate (transmit/receive). The SUOC radio takes advantage of the adaptive nature of the FUOC that is already present in the occupied channel to enable modulation, power, and/or rate adaptation in the FUOC radio's transmitted signal to bring about an evolution that results in a coexistence of the FUOC and SUOC in the channel originally occupied only by the FUOC signal. A rate pair and transmit power pair that is acceptable to both the FUOC and SUOC radios is reached by active-intelligent actions emitted by the SUOC and reactive adaptations of the FUOC, with no direct communication between the two of them.

As will be described further below, the SUOC radio employs/performs: (1) spectrum sensing and parameter estimation systems and methods to characterize potential FUOCs; (2) a rate pair prediction tool to guide the SUOC radio's choice of FUOC to target along with an appropriate rate pair (SUOC and FUOC achievable rates); (3) machine learning methods to automatically and dynamically ("on the fly") take advantage of experience/history; (4) a decision making unit (processor) with multiple possible procedures that govern steps of interaction; and (5) a multiuser detection receiver to deal with the interference once information-bearing transmission has commenced by the SUOC radio.

Referring now to FIG. 2, occupied space (e.g. an occupied channel) is not useful if interference is simply treated as unstructured noise. However, a multi-user detection (MUD) receiver in the SUOC node (e.g., node b) enables successful wireless communication in the same band as the FUOC (e.g., Node A) because a MUD receiver can effectively remove interference caused by the FUOC and help the SUOC "see through" that interference in order to receive and detect (or "see") a signal of interest from one or more other SUOC transmitters. For example, as shown in FIG. 2, a MUD receiver in SUOC Node b can allow Node b to detect and demodulate signals 18 received from SUOC Node a despite interference 16 from FUOC node A. Thus, by including a MUD receiver in a node, occupied space can, to some extent, be equivalent to a free and clear channel.

The ability of occupied space to be equivalent to a free and clear channel depends, of course, upon a variety of factors including, but not limited to: (1) power and rate of interfering signals from a FUOC as received at the SUOC node; (2) a FUOC's "view" of his signals of interest (i.e. signals from the other FUOC radios); and (3) a FUOC's capability to appropriately adapt in the presence of interference. This means that radios with MUD receivers do not need to look only for "white space" (i.e. unoccupied space), but can also use "black space" (or occupied space) within a frequency spectrum (or more simply "spectrum").

Figure 3:
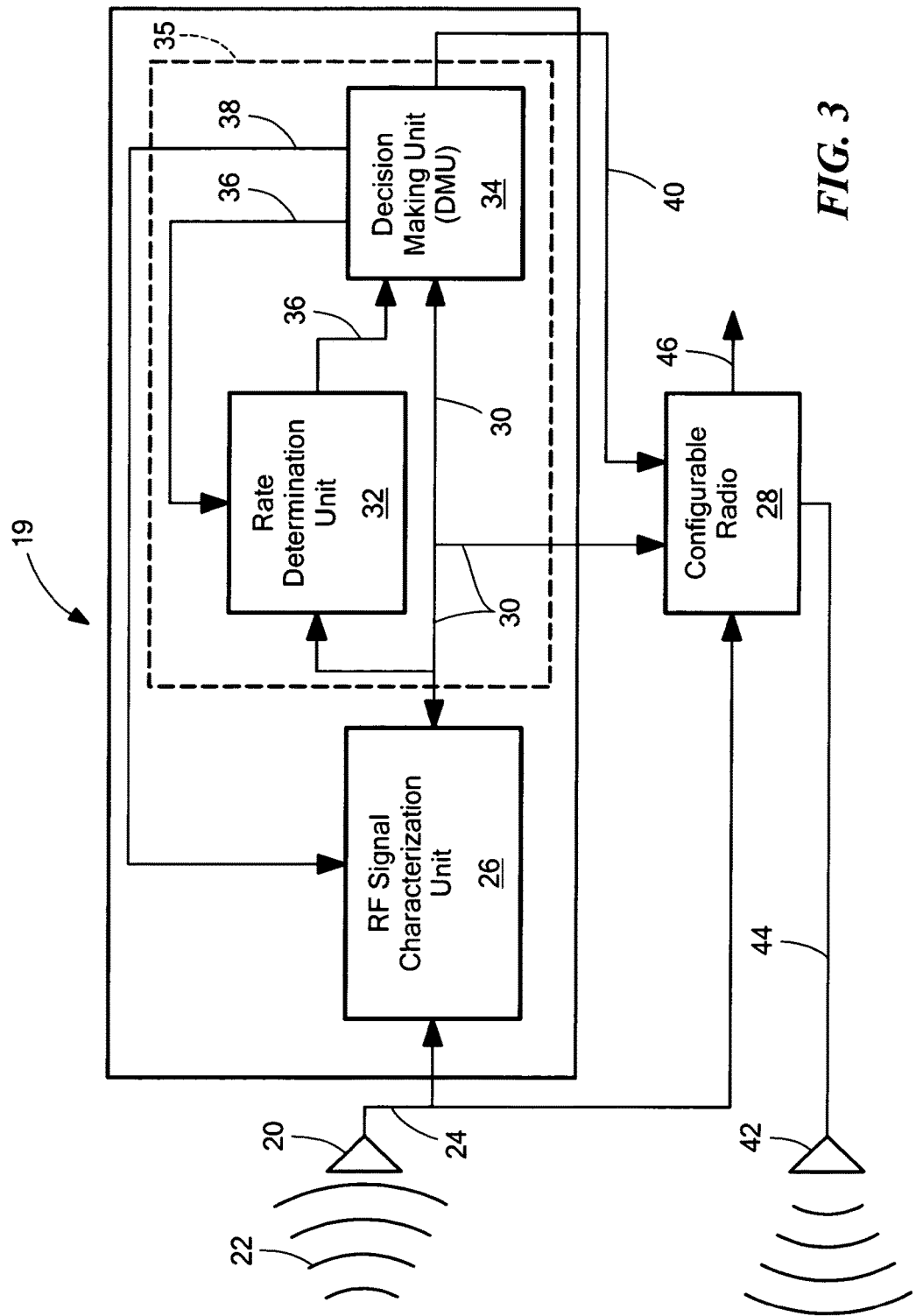
FIG. 3 is a block diagram of a transmit-receive system which includes a cognitive engine.

Referring now to FIG. 3, a system 19 that enables use of spectrum that is already being used by other radios includes a receive antenna 20 disposed to intercept electromagnetic waves or signals 22 propagating in the environment about the location of the receive antenna 20. Upon intercepting the electromagnetic signals 22, receive antenna 20 couples a radio frequency (RF) signal via a signal path 24 to an RF signal characterization unit (RFSCU) 26 and to a configurable radio 28.

RFSCU 26 receives the signals provided thereto via antenna 20 and processes the received signals to provide output data including, but not limited to parameters of the received signals. Such signal parameters may include, for example, a carrier frequency and band that corresponds to a unique FUOC transmitted signal (also referred to as a target FUOC) and one or more of the following parameters associated with each target FUOC: received signal power, received signal modulation type (e.g. QPSK), error correction coding type, code rate, received signal signature pulse, timing offset relative to reference, received phase offset relative to reference, baud rate and/or symbol duration, channel transfer function and/or multipath characterization of channel (all collectively referred to herein as "RFSCU signal parameters").

In at least one embodiment, both the RFSCU 26 and the configurable radio 28 may include a typical radio front-end to downconvert and process received RF signals. In some embodiments, both the RFSCU 26 and the configurable radio 28 may each use the same front-end circuitry. In some embodiments, a sliding filter may be provided as part of front-end circuitry to observe the different RF bands one at a time in the RF characterization unit 26. In some other embodiments, a wideband front-end may be used to capture signals within multiple (or all) of RF bands of interest at the same time.

RFSCU 26 is capable of sensing or otherwise detecting all or part of an RF spectrum that is potentially available for use by a SUOC radio. For each block of spectrum under examination by RFSCU 26, the RFSCU 26 measures and/or estimates each band of spectrum that is associated with a single RF system and/or radio, as well as other signal parameters that are needed for operation of a coexistence cognitive radio or a system which includes or utilizes a coexistence cognitive radio or any related coexistence cognitive radio techniques. As described above, such signal parameters may include, but are not limited to: received signal power, received signal signature pulse shape (e.g. root raised cosine), received signal modulation type (e.g. QPSK), timing offset relative to reference, received phase offset relative to reference, baud rate and/or symbol duration, error correction coding type, code rate, channel transfer function and/or multipath characterization of a channel.

It should also be appreciated that RFSCU 26 can also be used for pre-engagement of SUOC radios to acquire an estimate of the received power of the SUOC transmitters to which this receive SUOC radio will ultimately communicate. This pre-engagement SUOC characterization can alternatively be done in configurable radio 28 described further herein below.

Some or all of the RFSCU signal parameters are coupled via a signal path 30 to configurable radio 28 as well as to a rate determination and FUOC grading unit 32 (RDFGU 32) and a decision-making unit (DMU) 34. Configurable radio 28 includes a transmitter and multiuser detection (MUD) receiver.

For each target FUOC identified to RDFGU 32, RDFGU 32 is capable of determining a recommended rate for the SUOC that will allow for the MUD in the SUOC receiver to successfully pull out the SUOC signal of interest in the presence of the target FUOC's interfering signal. RDFGU 32 is also capable of computing a grade for each target FUOC that corresponds to the potential success the transmit-SUOC of interest will have in settling into coexistence with that target FUOC. Thus, in response to the signals provided thereto, RDFGU 32 determines SUOC recommended power and rate, and/or a grade, or one or more sets of powers and rates, and/or one or more sets of grades and provide such information to DMU 34 via signal path 36. Thus, signal path 36 carries a list of recommended rates, or set(s) of rates for the transmit-SUOC to coexist in the presence of each target FUOC presented on signal path 30, along with a grade corresponding to the anticipated probability of success of an attempt to coexist with that target FUOC. Alternatively, and in addition to or in place of the above, signal path 36 may carry a max rate, a min rate, and/or other rate possibilities for each target FUOC. Also, if the SUOC has more than one MUD receiver it can use, then there would be a rate or set of rates for each MUD.

DMU 34 receives the signals provided thereto from RFSCU 26 and RDFGU 32 and in response thereto, DMU 34 provides one or more of control information and SUOC max and min power limits to RDFGU 32 via signal path 36. It should be appreciated that DMU 34 may request another grade and recommendation for rate if the target FUOC's power or rate changes across the time periods in which the parameters have been consecutively estimated (this can be accomplished in a reactive settling process, for example), along with any constraints DMU 34 puts on the SUOC's power. Also, along with this request, the new power and/or rate of the target FUOC is provided to the RDFGU 32. This may be accomplished, for example, by the RFSCU 26 and a trigger message provided from either RDFGU 32 or DMU 34 to RFSCU 26 to tell the RFSCU 26 to collect and estimate the needed parameters in the target band.

As shown in FIG. 3, DMU 34 provides control information along path 36 to RDFGU 32. This control information is used by RDFGU 32 to trigger it to provide specific output along path 36 at times this new information is required by DMU 34 to perform the various functions of DMU 34 as described herein. The control information passed from DMU 34 to RDFGU 32 along path 36 may contain, but is not limited to the following: request for transmit-SUOC achievable rate/s in presence of target FUOC, and values used in the determination of the SUOC's achievable rate/s such as transmit-SUOC's received signal-to-noise ration (SNR), MUD/s to be used in the receive SUOC for each achievable transmit-SUOC rate, target FUOC modulation, grade, and, if applicable, target FUOC's coding rate and received power.

DMU 32 provides control information to RFSCU 26 along path 38. The control information is used by RFSCU 26 to trigger it to provide specific output information along path 30 at times this new parameter information is required by DMU 32 to perform the various DMU 32 functions that are described herein. The control information passed from DMU 32 to RFSCU 26 along path 38 may contain, but is not limited to, the following: 1) request for target FUOC carrier frequency and bandwidth, modulation and received SNR; 2) request for transmit-SUOC received SNR, channel transfer function, carrier frequency, phase offset, baud timing offset; and 3) request for complete or partial list of received signal parameters for all or portions of RF spectrum reserved for use by the SUOC radio network.

It should be appreciated that DMU 32 is capable of using the target FUOC list and corresponding parameter information provided on signal path 30 along with the recommended transmit SUOC rates for each target FUOC provided on signal path 36 to determine the best action for the transmit SUOC radio. This action is in the form of waveform choices, including, but not limited to rate of data transmission (bits per channel use or bits per Hertz) and transmit power.

DMU 32 also determines transmit-SUOC transmit waveform parameters (including but not limited to carrier frequency, bandwidth, power and rate) and provides such information to configurable radio 28 along signal path 40. Thus, signal path 40 carries the output from DMU 34 (e.g. SUOC transmit waveform parameters) that contains a single choice of target FUOC along with specific parameters that define the transmit-SUOC waveform to include rate, as well as the transmit power to be used by the transmit-SUOC.

Configurable radio 28 receives signals from RFSCU 26, DMU 34 and antenna 20 and in response thereto, configurable radio 28, provides an RF signal to be transmitted to a transmit antenna 42 via a signal path 44. It should be appreciated that transmit antenna 42 may be the same as receive antenna 20 (i.e. as is known to those of ordinary skill in the art, the antenna used in the receive system and the antenna used in the transmit system may be the same physical antenna which is coupled to both receive and transmit signal paths).

At a second output, configurable radio 28 provides a digital stream of bits (a "bit stream") demodulated and decoded from a transmit-SUOC signal of interest along signal path 46. This is the decoded bits associated with the transmission from the transmit-SUOC radio of interest to this receive-SUOC radio.

As noted above, should be appreciated that configurable radio 28 includes a transmitter and multiuser detection (MUD) receiver. Radio 28 is capable of transmitting control signals to the transmit-SUOC as well as receiving and understanding control signals from the other SUOC radios to which it is the transmit-SUOC. It is also capable of transmitting buffered data via wireless transmission, according to a given waveform to include the medium access control scheme and other network layer protocols appropriate for successful wireless communication among radio nodes such as what is used in the cell phone handsets and base stations or in WiFi nodes and gateways.

Radio 28 may be provided, for example, from technology known to one of ordinary skill in the art of wireless communication systems and MUD receivers.

System 19 is capable of sensing the available spectrum and determining good candidate FUOC user bands in which system 19 (e.g. a SUOC system) could successfully communicate given the MUD available on the SUOC radio.

This apparatus is capable of iterative transmission/probing, sensing, learning, and decision making, to bring about an acceptable communication rate for both the SUOC and the FUOC systems so that they both can utilize the same frequency band for communication.

As will be described in detail in conjunction with FIG. 4, the SUOC radios may traverse a plurality of stages when transitioning between a state of having no spectrum in which to transmit to a state of successful transmission in a pre-occupied band.

Figure 3A:
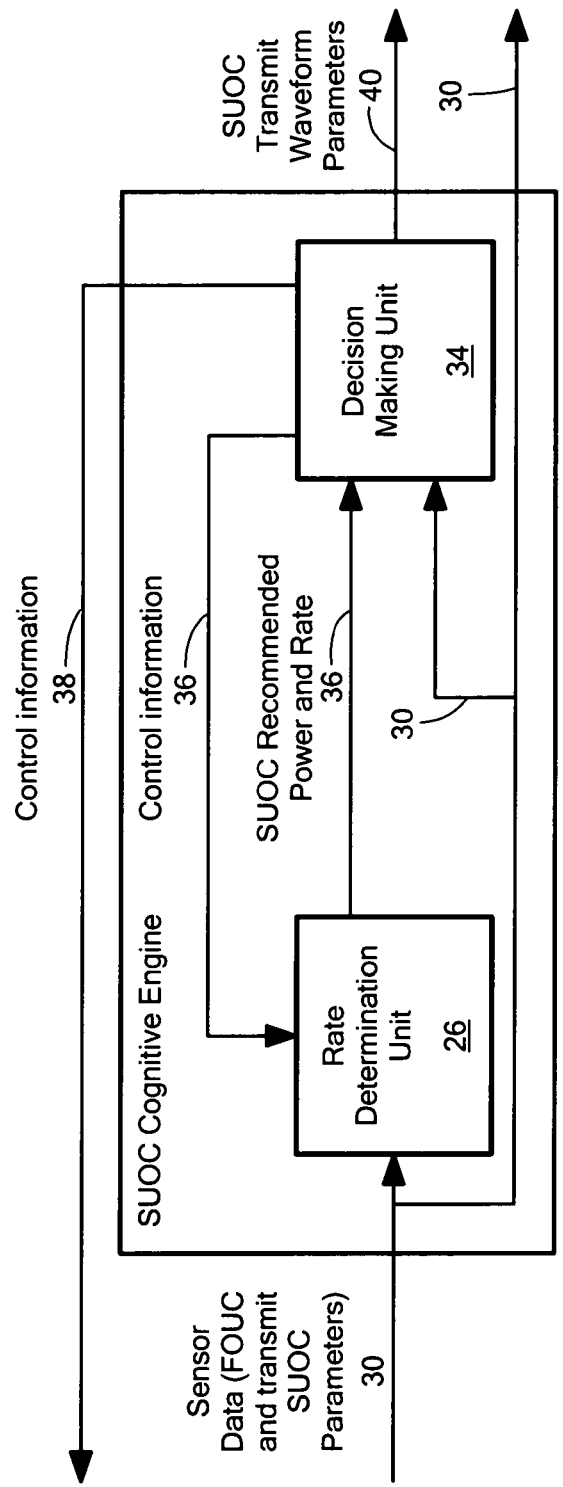
FIG. 3A is a block diagram of a (second user on a channel) SUOC cognitive engine.

Referring briefly to FIG. 3A in which like elements of FIG. 3 are provided having like reference designations, RFDGU 26 and DMU 34 form a SUOC cognitive engine (CE) 35. The function of the SUOC CE is, among other things, to autonomously guide SUOC radio state transitions, guide processing and actions within each state transition, and to perform some processing and actions that are needed to make decisions and provide guidance. CE 35 provides an important function during the settling process. To accomplish this function RDFGU 26 is enlisted to collect information and estimate parameters whenever DMU 34 needs new information for a new decision.

One goal of a receive-SUOC CE is to achieve acceptable coexistence transmission by a transmit-SUOC radio or to determine if a target-FUOC radio should be abandoned.

The cognitive engine 35 orchestrates the process that results in the determination of a power level and communication rate the SUOC transmitter will employ when the SUOC transitions to the communication state.

Figure 4:
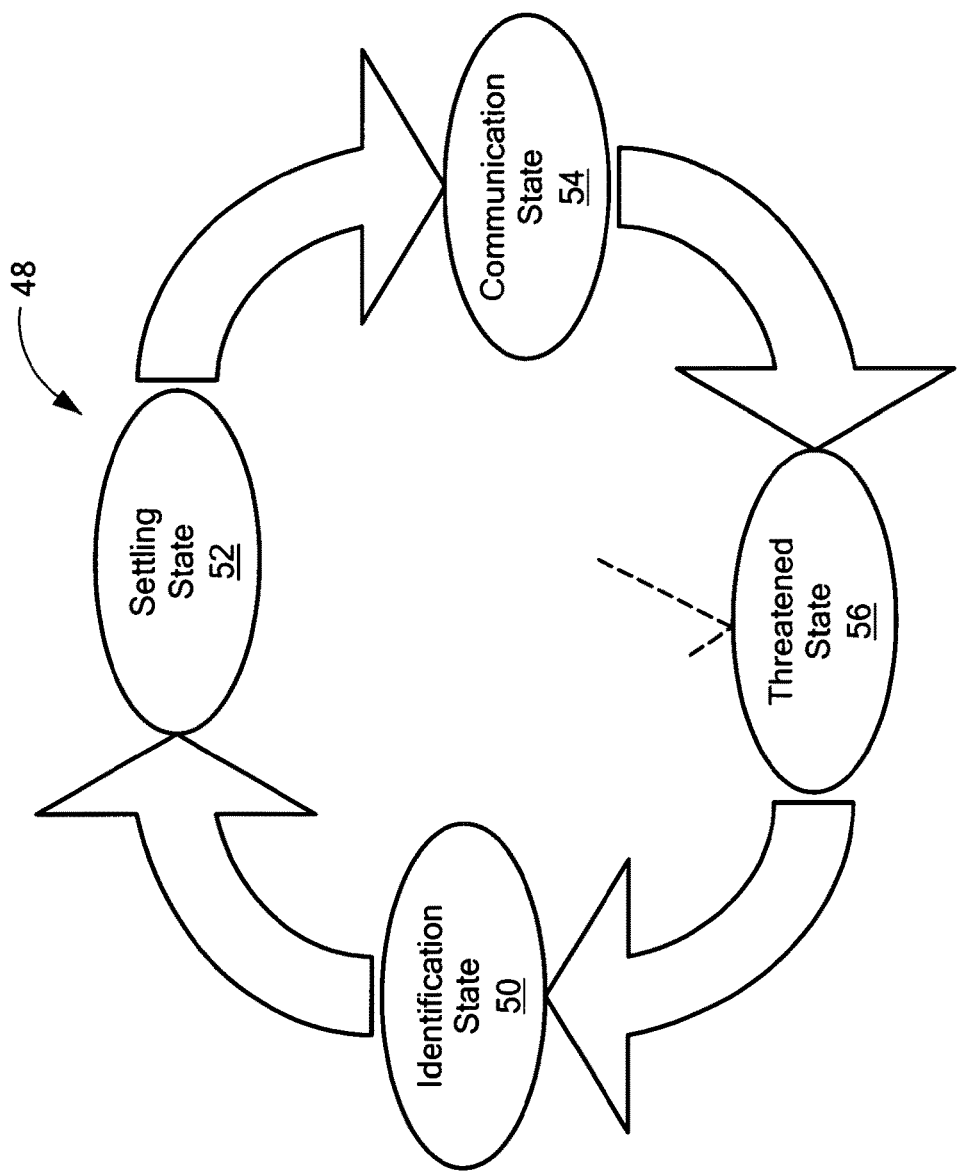
FIG. 4 is a state diagram of a SUOC radio illustrating the states the SUOC radio traverses to accomplish and maintain successful communications in coexistence with a first user on FUOC.

Turning now to FIG. 4, a state transition diagram 48 illustrates a process between a single receiver-SUOC radio and a transmit SUOC radio needed to complete a link with the receive SUOC radio. A first SUOC radio state is an identification (ID) state 50. While a SUOC radio is in this state, it is scanning an RF spectrum and looking for (i.e. attempting to detect) suitable FUOC radios with which to coexist. It should be appreciated that prior to entering identification state 50 (i.e. the first state), the SUOC radios will need to "discover each other" or otherwise create and maintain a list of radios that are one-hop neighbors (and possibly neighbors more than one-hop removed) as well as acquire any other topographic and/or routing information required to maintain network communication. Establishing and maintaining a list of SUOC radio network members that require the coexistence link can be accomplished by any means appropriate, such as those used in dynamic spectrum access radios that seek unoccupied space for operation.

A second SUOC radio state is a settling state 52. While a SUOC radio pair is in this state, the transmit-SUOC radio is trying the hypothesized power and the receive-SUOC radio is observing a target-FUOC radio and channel to look for any significant changes in its behavior. If needed, a process of computing achievable rates and transmitting at different power levels is iterated until a suitable transmit rate and power is reached that allows for acceptable coexistence with the target-FUOC radio and channel previously identified in the identification state as being most suitable for coexistence.

If the SUOC radio pair determines an acceptable rate and power, the SUOC radio pair transitions to a third state which corresponds to a communication state 54.

While in the communication state 54, the receive-SUOC radio (of the SUOC radio pair) is receiving signals from the transmit-SUOC radio with which it has successfully established a coexistence link. A MUD receiver may be employed in this state to mitigate interference caused by a target-FUOC signal that interferes with the transmit-SUOC signal of interest. As described previously, in some implementations, error correction coding and/or multiple input, multiple output (MIMO) techniques may be used to deal with interference caused by FUOC's rather than a MUD receiver.

If no acceptable rate and power is possible, the SUOC radio pair transitions to a threatened state 56 to determine parameters that will be used in finding another candidate target-FUOC. The threatened state exists either when successful reception of a transmit-SUOC radio's signal is threatened or degraded by external events that were not present at the establishment of the communication state or when a targeted FUOC turns out to be inadequate. In other words, the successful communications, for some reason, has not occurred or has been disrupted. Disrupted communications is often due to change in location of the SUOC nodes which causes a degradation in the channel. It could also be caused by other factors in the RF or physical environment.

Regardless of how communications is degraded or disrupted, the one or both of the SUOC pair radios identifies a diminished communication link and conveys the existence of the identified diminished communication link to the DMU in the receive-SUOC radio (e.g. DMU 34 in FIG. 3). The DMU logs parameters for use in the next round of target FUOC identification, then initiates a new identification state to look for a better band for closing the link with the transmit-SUOC radio.

It should be appreciated that a receive-SUOC can be in a communication state with one of its member SUOCs and in an ID state with another, and in a threatened state with another, etc. As noted above, the intent of the state transition diagram of FIG. 4 is to explain the process between a single receive-SUOC and one of the transmit-SUOCs that is needed to close the link with this receive-SUOC.

As noted above, the system described in conjunction with FIG. 3 is capable of supporting each of four states 50-56 and provided below is a detailed description of each state as accomplished by apparatus shown in the illustrative system 19 (FIG. 3).

Some additional details of identification state processing are next described. It should be appreciated that the identification process may be accomplished as follows by a coexistence cognitive radio apparatus which is the same as or similar to that described above in conjunction with the illustrative system 19 of FIG. 3.

The identification process may be summarized as follows: first, a spectrum map is created and potential target FUOC radio and channel characterization is performed. Next, SUOC member radio signal and channel characterization is performed in potential target bands. Next, to determine estimated link throughput for each potential FUOC radio and channel targeted for coexistence, it is necessary to make a decision as to which FUOC radio and channel to target for coexistence and the identification process is complete and the SUOC radio exits the identification state, and enters the settling state.

The identification process is next described in more detail in the context of the illustrative coexistence cognitive radio apparatus of FIG. 3. It should, of course, be appreciated that the described process may be performed by an apparatus other than the coexistence cognitive radio apparatus of FIG. 3 and references to particular structures performing particular functions are made only for the purpose of achieving clarity in the description of the broad concepts described herein. Such references are not intended as, and should not be construed as, limiting.

In one illustrative embodiment, to create a spectrum map and potential target-FUOC radio characterization, RFSCU 26 scans a candidate frequency spectrum and characterizes each band as being unoccupied, or occupied. All occupied bands are further characterized by RFSCU 26 by estimating parameters for each occupied band that will be used by other units within the SUOC apparatus. As discussed above, these parameters include: received signal power, received signal modulation type (e.g. QPSK), received signal signature pulse, timing offset relative to reference, received phase offset relative to reference, baud rate and/or symbol duration, channel transfer function and/or multipath characterization of channel. The technology required to provide such functionality is well known to those of ordinary skill in the art of radio frequency signal characterization systems. RFSCU 26 provides an annotated spectrum map (spectrum map with associated parameters) an output along signal path 120 RFDGU 32, DMU 34 and configurable radio 28 for later use.

To accomplish SUOC member radio signal and channel characterization in potential target bands, RFSCU 26 within the SUOC receiver determines the received power and coarse level channel characterization (e.g. approximate duration of multipath-induced inter-symbol interference, course estimate of time coherence of channel) of the other SUOC radios in its neighbor network by engaging in an exchange of training tones or pulses or other appropriate signaling. RFSCU computes each SUOC member radio signal parameters (such as received power) and channel parameters (such as multipath structure) and provides this information along signal path 30 to both RFDGU 32 and DMU 34 for later use. The technology required to implement the functions of RDFGU 32 is known to those of ordinary skill in the art of RF signal characterization systems and/or wireless communication systems.

To determine estimated link throughput and grade for each potential FUOC radio targeted for coexistence, for each occupied band (i.e. for each FUOC radio found and characterized by RFSCU 26), RFDGU 32 determines the transmit-SUOC radio rate for communication in the presence of the target-FUOC radio and provides this information to DMU 34 (e.g. along signal path 36 for later use. In addition to the determined transmit-SUOC rate, a grade associated with this rate and target FUOC radio is computed by RFDGU 32 and is output along line 36 to DMU 34 for later use.

To decide which FUOC radio to target for coexistence, DMU 34 performs a decision method and procedure that makes use of the parameter information provided thereto (e.g. along signal path 30) and the rate choice and grade input along line 36, and any previously collected historical information saved from prior interactions at other times with similarly characterized FUOC radios. If no historical information has been collected, or if the DMU 34 has chosen to ignore historical data on long-past settling attempts, the FUOC radio with the highest grade as determined by the RDFGU 32 will be chosen as the target FUOC radio with which to settle. If settling with this highest-grade FUOC radio has just failed, then the next highest-grade FUOC radio will be chosen, and so on, until a FUOC radio is successfully settled into coexistence with the transmit-SUOC radio.

If historical data has been collected and is chosen to be used by DMU 34 in the decision making process, a new set of grades may be computed based on the historical data, the composite grade list. The composite grade for each target-FUOC radio in association with the current transmit-SUOC radio of interest may be a function of the grade provided by the RDFGU 32 and a factor derived from the historical database features attributed to this same target-FUOC radio with similar circumstances for transmit-SUOC radio. One example of a composite grade computation is to multiply the RDFGU grade by a factor that ranges from 0 to 1, determined to represent the probability of successful settling from past attempts to settle with the target-FUOC radio or similar target-FUOC radio under conditions similar to those existing with the current transmit-SUOC. The target FUOC radio chosen to engage in the settling process is the target FUOC radio with the highest composite grade. DMU 34 provides the necessary transmit SUOC waveform parameters (such as carrier frequency and bandwidth) that match its decision for a target FUOC radio and coexistence rate and power. When the identification process is complete, the SUOC radio exits the identification state 50 and enters the settling state 52. The settling process is described next.

Figure 5:
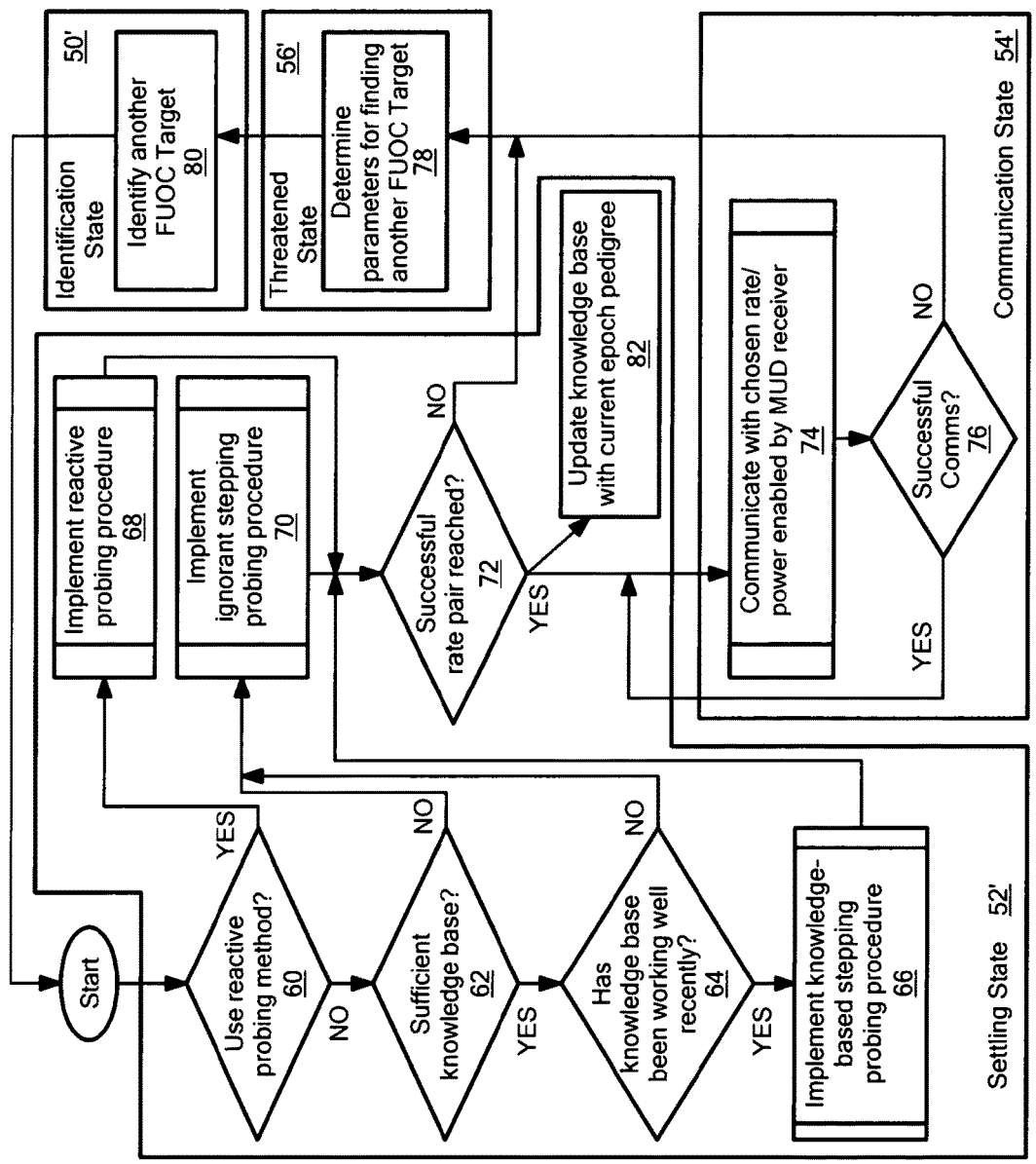
FIG. 5 is a flow diagram illustrating a procedure for controlling a SUOC radio.
Figure 7:
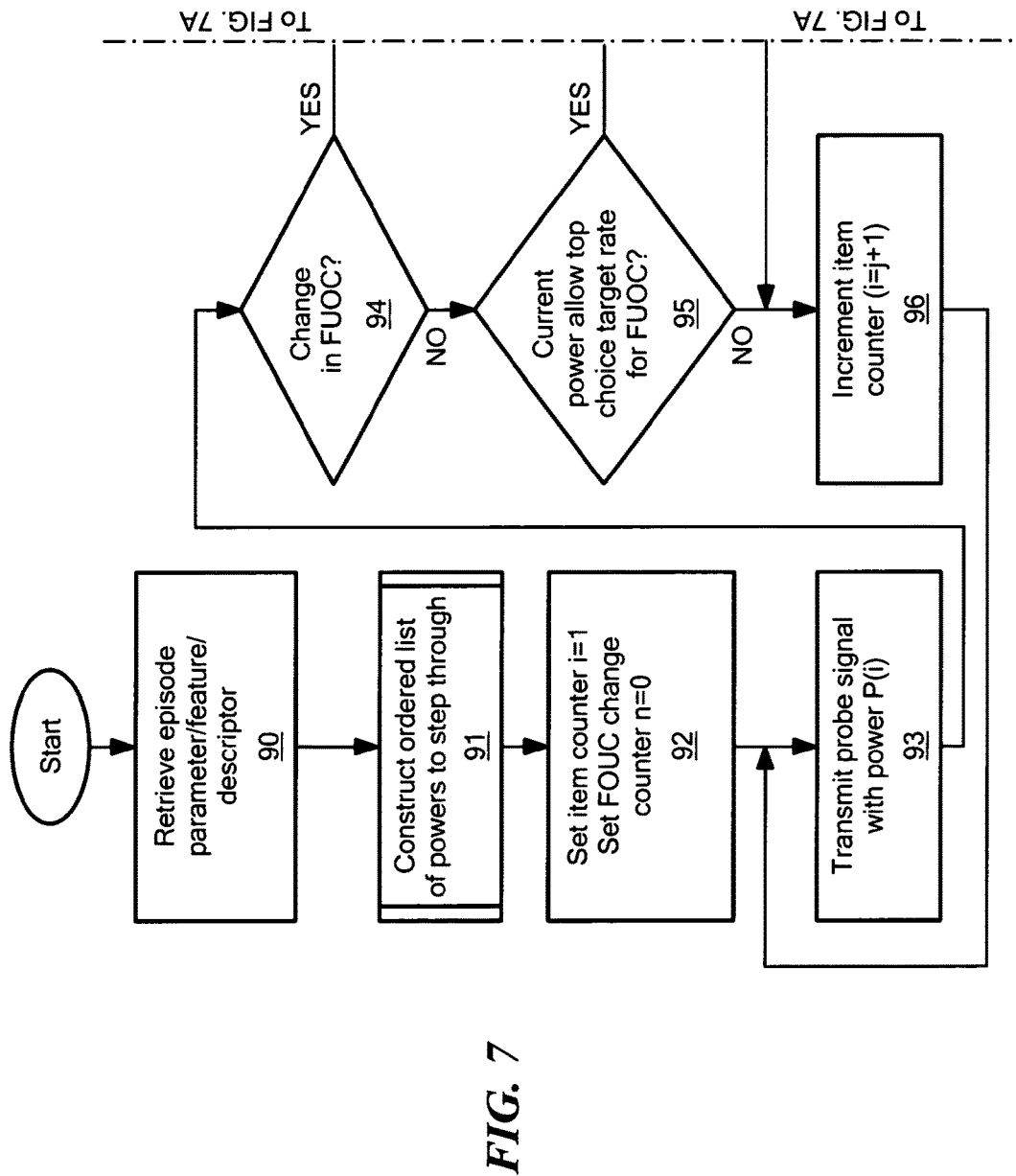
FIGS. 7 and 7A together form a flow diagram illustrating an example implementation of a list-based stepping probing procedure.
Figure 7A:
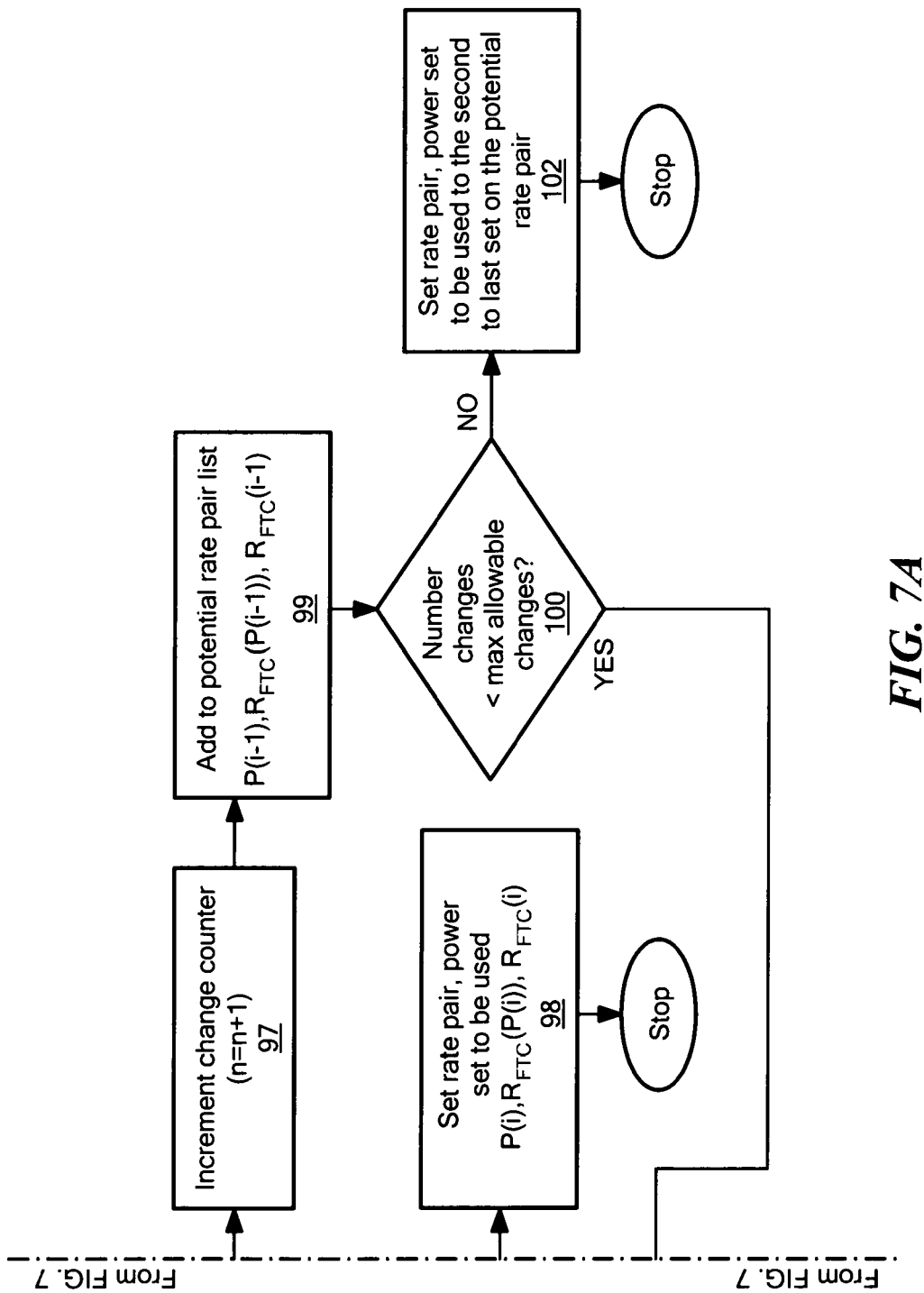
Figure 9:
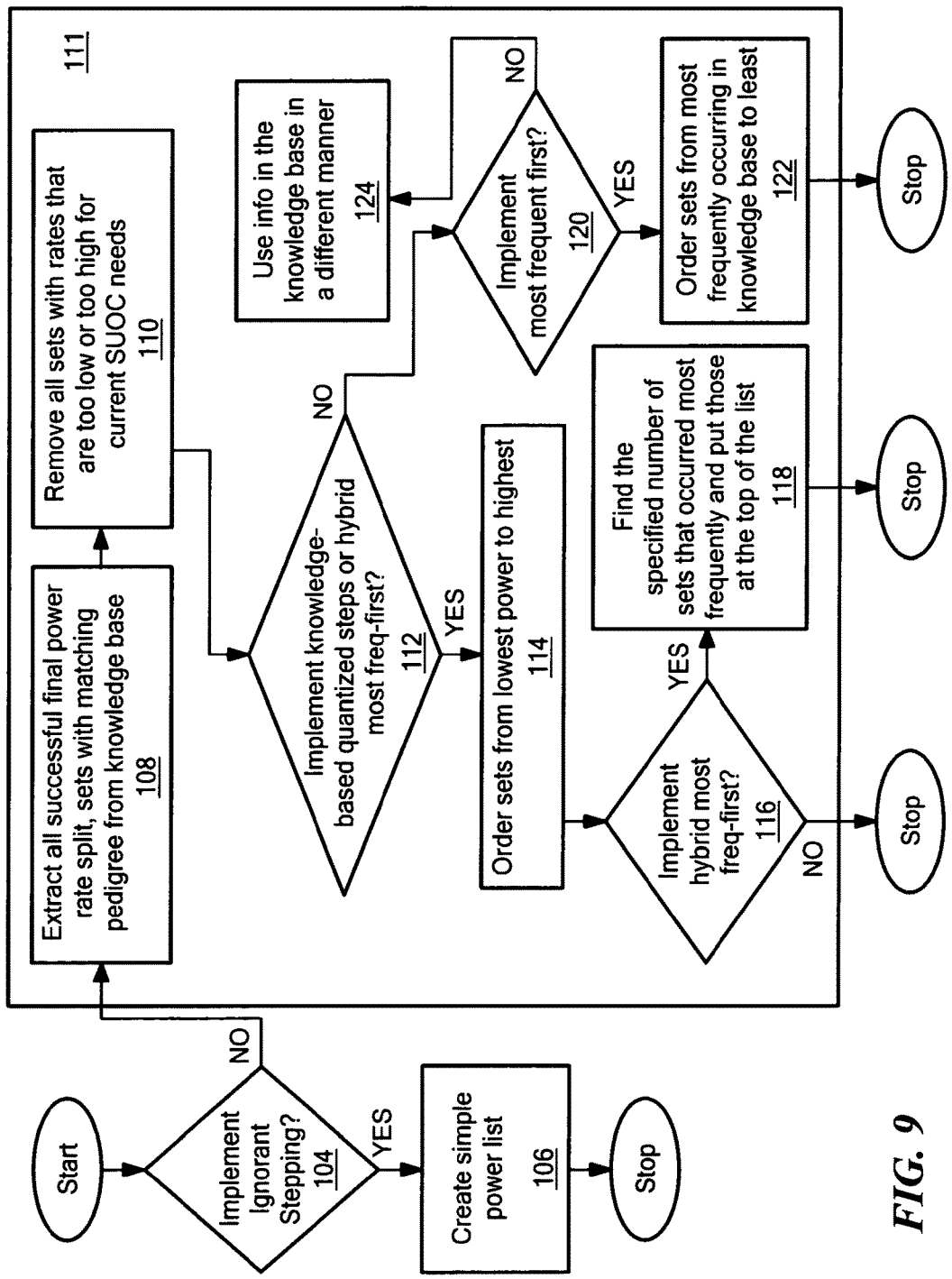

FIGS. 5, 7A and 9 are flow diagrams which illustrate the processing performed by a processing apparatus which may, for example, be provided as part of a network which includes SUOC radios which may be the same as or similar to those described in any of FIGS. 1-4. The rectangular elements in the flow diagrams (e.g. block 66 in FIG. 5) are herein denoted "processing blocks" and represent steps or instructions or groups of instructions. Some of the processing blocks can represent an empirical procedure or a database while others can represent computer software instructions or groups of instructions. The diamond shaped elements in the flow diagrams (e.g. block 60 in FIG. 5) are herein denoted "decision blocks" and represent steps or instructions or groups of instructions which affect the processing of the processing blocks. Thus, some of the processes described in the flow diagram may be implemented via computer software while others may be implemented in a different manner e.g. via an empirical procedure or via hardware.

Alternatively, some of the processing and decision blocks can represent processes performed by functionally equivalent circuits (e.g. integrated circuits) such as a digital signal processor (DSP) circuit or an application specific integrated circuit (ASIC). The flow diagrams do not depict the syntax of any particular programming language. Rather, the flow diagrams illustrate the functional information one of ordinary skill in the art requires to perform the processes or to fabricate circuits or to generate computer software to perform the processing required of the particular apparatus. It should be noted that where computer software can be used, many routine program elements, such as initialization of loops and variables and the use of temporary variables are not shown. It will be appreciated by those of ordinary skill in the art that unless otherwise indicated herein, the particular sequence of processes described is illustrative only and can be varied without departing from the spirit of the concepts, systems and techniques disclosed herein.

Figure 6:
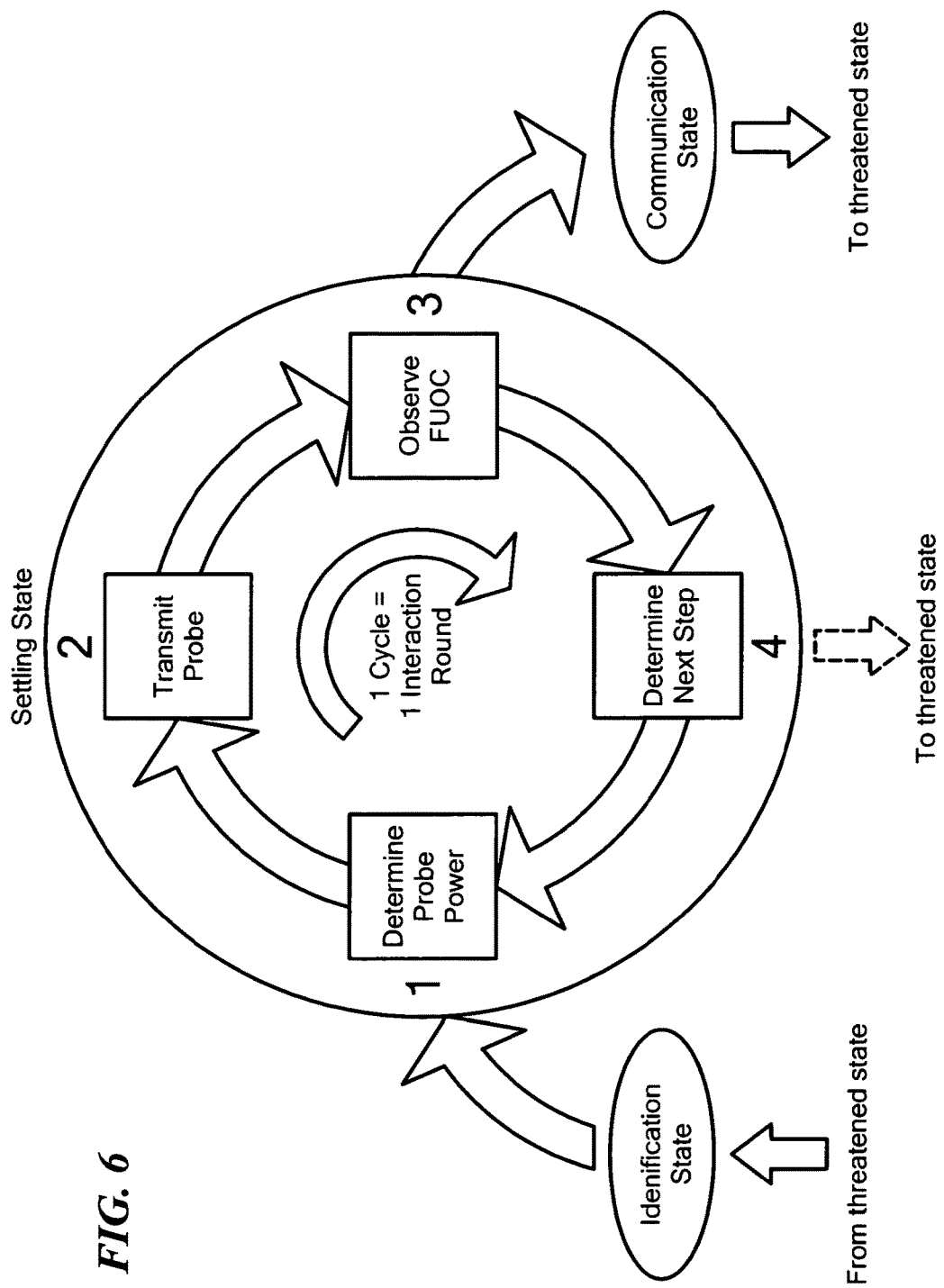
FIG. 6 is a state diagram illustrating an example settling process for a SUOC radio through interaction with FUOC.

Referring now to FIG. 5 shown is a high level flow procedure used by (e.g. implemented within) a SUOC radio to control its actions as well as to control the transitions it makes from one state to another after successfully completing the identification process. FIG. 5 illustrates a cycle a SUOC radio may traverse while in the settling state. The process is accomplished by cycling through four actions as described below and as also described in conjunction with FIG. 6.

Turning now to FIG. 5, upon entering the settling state 52', which may be the same as or similar to setting state 52 described above in conjunction with FIG. 4, processing begins in decision block 60, in which a coexistence cognitive radio (and in some cases a SUOC cognitive engine (CE) within a coexistence cognitive radio) determines if a reactive probing procedure is to be used. This could, for example, be a user-set parameter or could be set by a cognitive engine for any number of reasons/triggers experienced during operation.

If a reactive probing procedure is to be used, then processing proceeds to processing block 68 in which the SUOC CE guides implementation of a reactive probing procedure.

After the reactive probing procedure 68, processing flows to decision block 72 in which a decision is made as to whether a successful rate pair was reached.

If it is determined that a successful rate pair was reached, then the SUOC enters its communication state 54' and processing proceeds to processing block 74 in which the SUOC communicates with the chosen rate/power enabled by the MUD receiver. Processing then flows to decision block 76 where a determination is made as to whether there is successful communications.

If in decision block 76 a determination is made that there is successful communications, then the SUOC remains in its communication state and processing loops back to processing block 74 and this loop is repeated as long as successful communications exist.

If in decision block 76 a determination is made that there is not successful communications, then the SUOC radio enters its threatened state 56' and processing proceeds to processing block 78 where parameters are determined for finding another SUOC radio target. The SUOC radio then enters its identification state 50' and processing proceeds from processing block 78 to processing block 80 where the SUOC radio identifies another FUOC target radio.

If in decision block 60, a decision is made that the reactive probing technique will not be used, then processing proceeds to decision block 62 where a decision is made as to whether a sufficient knowledge base exists. If in decision block 62 a decision is made that a sufficient knowledge base does not exist, then processing proceeds to processing block 70 in which a so-called "ignorant stepping procedure" is implemented. Upon completion of the ignorant stepping procedure, processing flows to decision block 72 and processing proceeds through blocks 72-80.

If in decision block 62, a decision is made that a sufficient knowledge base does exist, then processing proceeds to decision block 64 in which another decision is made as to whether the knowledge base has been working well recently. If in decision block 64 a decision is made that the knowledge base has not been working well recently, then processing proceeds to processing block 70 in which the ignorant stepping procedure is implemented and upon completion of the ignorant stepping procedure, processing flows to decision block 514 and processing proceeds through blocks 72-80.

If in decision block 64 a decision is made that the knowledge base has been working well recently, then processing proceeds to processing block 66 in which a knowledge-based stepping probing procedure is implemented and upon completion of the knowledge-based stepping probing procedure, processing flows to decision block 72 and processing proceeds through blocks 72-80.

A procedure for controlling a settling process is described. As noted above, upon entering settling state 52' the SUOC CE determines if the reactive probing procedure is to be used. This could, for example, be a user-set parameter or could be set by the CE for any number of reasons/triggers experienced during operation.

If a reactive probing procedure is to be used, then the SUOC CE guides implementation of the reactive probing procedure.

In one embodiment, determining the first probing power to try can be accomplished from the following: (A1) Max Power: the transmit-SUOC transmit power that would correspond to a received $SNR_{a,initial}$ at the receive-SUOC to achieve the desired max rate for the receive-SUOC in the presence of this FUOC when using the MUD receiver that is implemented in the receive-SUOC. This $SNR_{a,initial}$ can be solved by using the rate boundary equations described in co-pending application number PCT/US2013/031900, filed Mar. 15, 2013 and incorporated herein by reference in its entirety; (A2) Min Power: the transmit-SUOC transmit power that would correspond to a received $SNR_{a,min}$ at the receive-SUOC to achieve the minimum desired rate, $R_{a,min}$, in the presence of this FUOC when using the MUD receiver that is implemented in the receive-SUOC: (A3) Med Power: Another option is to choose an intermediate power between the Max Power and Min Power defined in (A1) and (A2); (A4) Learned Initial Power: Over time, the DMU 34 logs historical results and can therefore search the data history to determine which initial power scheme resulted in the smoothest settling process out of (A1)-(A3) approaches.

If the settling procedure (i.e. 52' in FIG. 5) results in a successful rate for the SUOC as well as for the target FUOC, then the knowledge data base is updated with information about this FUOC and its initial identifying parameters and the final successful waveform parameters for both the SUOC and FUOC. Then the CE guides the SUOC to exit the settling state 52' and enter the communication state 54'.

If, instead, the settling process 52' did not result in a successful rate for both SUOC and FUOC radius, the knowledge data base is also updated with information about this FUOC radio and the unsuccessful attempt at achieving coexistence as shown in processing block 82. In addition, the CE guides the SUOC to exit the settling state and enter the threatened state 56' in order to ultimately identify a new target-FUOC for attempt at settling into a successful coexistence (as shown at processing block 78 in FIG. 5).

If reactive probing is not to be used, then as noted above processing proceeds to decision block 62 in which the SUOC CE determines first if the knowledge base (the data base collected from past interactions with different FUOCs) is or is not sufficient for use during the current settling process. An example of sufficiency is if the knowledge base at least contains a number of instances of having encountered a FUOC radio having the same parameters that characterize the current target-FUOC radio.

If the knowledge base is not sufficient, then processing proceeds to processing block 70 in which the SUOC CE guides implementation of a settling procedure that does not require use of historical information. The SUOC implements an ignorant stepping trial and error procedure 70 that is described below in conjunction with in FIGS. 7, 7A, and 10.

Processing then proceeds to decision block 72 in which a decision is made as to whether a successful rate pair was reached (i.e. did the settling procedure result in a successful coexistence). If the settling procedure results in a successful coexistence, then the process includes updating the knowledge data base 82 with information about this FUOC and its initial identifying parameters and the final successful waveform parameters for both FUOC and SUOC. Then the CE guides the SUOC to exit the settling state and enter the communication state 54'.

If, instead, the settling process did not result in a successful coexistence, then the knowledge data base is again updated with information about this FUOC and its initial identifying parameters and the unsuccessful attempt at achieving coexistence as shown in processing block 82. In addition, the CE guides the SUOC to exit the settling state 52' and enter the threatened state 56' in order to ultimately identify a new target-FUOC for attempt at settling into a successful coexistence (as shown in processing block 78 in FIG. 5).

If, in decision block 62, the CE determines the knowledge data base to be sufficient, then processing next flows to decision block 64 in which the CE determines if the knowledge base has been working well in recent attempts with similar FUOC target radio similar to the current target radio.

If, on the other hand, a decision is made in decision block 64 that the knowledge base has not been working well, then processing flows to decision block 70 in which an "ignorant stepping procedure" is performed (i.e. the CE guides the SUOC radio to perform an ignorant stepping procedure). For example, if the knowledge base has many instances of FUOC radios that resemble the current target radio, and if settling has been tried recently using these instances but has not been efficient or effective, then the knowledge data base is deemed "stale" and not worth using. Thus, the next step is to implement an ignorant stepping procedure as shown in processing block 70 that does not use the knowledge data base.

Processing then flows to decision block 72 in which a decision is made as to whether a successful rate pair was reached.

If, instead of the situation in which the knowledge base is not working well, the CE determines that the knowledge base is working well (e.g. a decision is made in decision block 64 that the knowledge base is working well), the CE guides the SUOC radio to implement the knowledge-based stepping procedure described in FIGS. 7-12.

If the settling procedure 52' results in a successful coexistence (e.g. a decision is made in decision block 72 that a successful pair has been reached), then the SUOC exits its settling state and enters its communications state 54' and processing proceeds to processing block 74 where communication begins using a chosen rate/power enabled by a MUD receiver. Processing block 74 and decision block 76 implement a loop in which as long as successful communications exist, the SUOC radio remains in its communicating state 54'.

If a decision is made in decision block 76 that successful communication no longer exists, then the SUOC radio exits the communication state and enters the threatened state and processing flows to processing block 78 where parameters for finding another FUOC radio target are determined.

Once the parameters are determined, the SUOC radio exits its threatened state 56' and enters its identification state 50' and processing proceeds to processing block 80 where another FUOC target is identified.

Once a FUOC target radio is identified, the SUOC radio exits its identification state 50' and enters its settling state 52' and processing proceeds as described above.

If, instead, the settling process 52' did not result in a successful coexistence, then the SUOC radio exits its settling state and enters its threatened state 56'.

In some exemplary embodiments, an illustrative reactive probing procedure is used as described below in steps (A)-(J). The following notation is used in steps (A)-(J): SNRa=received SNR due to the most recent probing signal transmitted by the transmit-SUOC radio; SNRA=received SNR due to the signal transmitted by the target-FUOC radio; Ra=achievable rate computed by an RDFGU (e.g. an RDFGU 32 as shown in FIG. 3) for current situation of SUOC radio and target FUOC radio; RA=actual rate of signal transmitted by target-FUOC radio; $R_{a,min}$=minimum acceptable rate for the link between transmit-SUOC radio and receive-SUOC radio that is attempting to be established; $R_{a,max}$=maximum desired rate for the link between transmit-SUOC radio and receive-SUOC that is attempting to be established; $SNR_{a,max}$=maximum allowable received SNR due to signal transmitted by transmit-SUOC radio. It will be appreciated that $SNR_{a,max}$ could be equivalently replaced with a max transmit power or a received SNR that is associated with a max transmit power constraint on the transmit-SUOC device.

The illustrative reactive probing procedure begins with (A) set the zeroth probing power to zero (indicating no communication between transmit and receive SUOC radio is possible) and set the fallback flag to zero (meaning no dialing down of SUOC radio power has occurred yet). (B) Next determine a first probing power to try. (C) If transmit-SUOC radio power is zero, go to (I). Otherwise, transmit-SUOC radio sends a probe signal that interferes with the FUOC radio's signal using the transmit-SUOC radio signal transmission power determined in the previous step. (D) Receive-SUOC radio observes the FUOC radio's signal. If the "fallback" flag has been set to one, go to (H). (E) If any negative changes occurred in the FUOC radio's signal modulation or power (modulation or rate decrease or power increase), log it; if not go to (G). (F) If the max number of allowable FUOC radio changes has been exceeded, set the transmit-SUOC radio settled power to the second to last power tried (before this last negative change occurred in the FUOC radio signal parameters), set the "fallback" flag to one, and go to (C). If the max number of allowable FUOC radio changes has not been exceeded, processing proceeds to (G). (G) Submit request for new (rate, MUD) pair determination to an RFDGU (e.g. RFDGU 26 in FIG. 3) based upon the last SNRa, SNRA, and FUOC radio rate. Use the information provided on line 36 (FIG. 3) to determine if desired pair ($R_{a,max}$, $MUD_{SUOC}$) is achievable with this SNRa, SNRA, and FUOC radio rate. If the desired pair ($R_{a,max}$, $MUD_{SUOC}$) is achievable, go to (I). If the desired pair ($R_{a,max}$, $MUD_{SUOC}$) is not achievable, increase the transmit-SUOC transmit power by some appropriate increment not to exceed the corresponding received $SNR_{a,max}$ and go to (C). (H) Submit a request for a new (rate, MUD) pair determination to unit 300 based upon the corresponding SNRa (corresponding to the "fallback" power since step H is executed only after the transmit-SUOC radio has dialed down its transmit power to the second to last highest power tried so far) and the just measured SNRA, and FUOC radio rate. Use this most recent output passed to DMU 34 from RFDGU 22 on line 36 to determine if a pair (Ra, $MUD_{SUOC}$), with Ra>=$R_{a,min}$ is achievable with the fallback transmit-SUOC SNRa and current FUOC signal SNRA and RA. If a pair (Ra, $MUD_{SUOC}$), with Ra>=$R_{a,min}$ is achievable with the fallback transmit-SUOC SNRa and current FUOC signal SNRA and RA, go to (J). If a pair (Ra, $MUD_{SUOC}$), with Ra>=$R_{a,min}$ is not achievable with the fallback transmit-SUOC SNRa and current FUOC signal SNRA and RA, go to (I). (I) Log current situation details in knowledge base and enter threatened state. (J) Log current situation details in knowledge base and enter communication state.

It should be noted from the description provided herein that three probing determination techniques have been developed: (1) Ignorant Stepping Probing (List based); (2) Knowledge-based Probing (List based); and (3) Reactive Probing.

Each of these techniques provides a different method for determining the next probing signal to use and whether the probing process should continue or stop. The implementation of all three techniques within a coexistence cognitive radio as described herein can provide a technique appropriate for the various conditions expected to exist at any given time for SUOC radios.

The first two methods, ignorant stepping probing and knowledge-based probing, both rely upon the construction of a list of powers for successive use by a decision-making unit (e.g. DMU 34 shown in FIG. 3) to simply "look up" the next power value to try with the next probing signal that is transmitted. The third method, reactive probing, requires a DMU (e.g. decision making unit 34) to request a new determination of rate and power from RFDGU 32 (FIG. 3) for each new probing signal trial.

All three methods are described in detail below.

List-based stepping is described at the highest level with three simple instructions 1. Construct List of Powers immediately after SUOC radio's entrance into settling state
2. Step through list until FUOC reacts a set number of times
3. Return to operating point prior to final FUOC reaction Referring now to FIG. 6, a SUOC radios' settling process through interaction with FUOC includes: (1) determining the candidate power; (2) probing the FUOC via a transmission from the SUOC transmitter radio; (3) observing the FUOC's signal to determine if any change has occurred; (4) return to step 1 to determine a new candidate power that may cause less damage to the FUOC, or, if no or little damage has been caused, exit this settling state and move into the communication state.

The system shown in FIG. 3 is capable of interacting with the FUOC radio without direct communication with the FUOC radio. The goal of these interactions is for the receive-SUOC radio (the SUOC radio that it is "listening" and receiving data on the occupied channel once communication commences) to determine if the rate and power that it has estimated to work for the transmit-SUOC radio (the SUOC radio that it is transmitting data on the occupied channel once communication commences) will allow the FUOC to remain effective as a communicator within its own FUOC network once the SUOC transmitter/s commence/s transmission. This interaction is referred to as the settling stage, in which a settling process is carried out.

This settling process is possible because of the adaptive feature of the FUOC radio. Specifically, the FUOC radio has a built-in feature that causes it to adjust its power and rate, and, in some cases, the direction of transmission, to overcome any less-than-ideal channel, noise and/or interference conditions in the RF environment. The SUOC radio, the subject of this invention, takes advantage of this FUOC quality to bring about coexistence so that both the SUOC and FUOC can successfully make use of the same RF band and at the same time with a sort of "soft" collision that either does no harm at all to the FUOC's ability to communicate, or causes the FUOC to only dial down its rate and/or dial up its power slightly to accommodate the SUOC's interference signal.

If during the settling process, the SUOC determines that the FUOC's rate and/or power have been compromised, the SUOC further determines if the compromise is within an acceptable range, thus allowing the SUOC network to maintain acceptable communications in the same band that was originally occupied only by the FUOC radios by causing a reasonable reduction in FUOC communication efficiency (e.g. a slightly lower rate or higher power). If the SUOC determines that its original identification of this FUOC as being a candidate for coexistence was wrong, the SUOC is capable of starting the identification process again to find a different FUOC target that is estimated to favorably accommodate coexistence. These interactions are described in conjunction with FIG. 5 and are referred to as the settling process.

Next, one illustrative implementation of a settling process is described. The settling process takes place within the cognitive engine portion of the apparatus shown in FIGS. 3 and 3A. After the identification process has completed, the settling process is accomplished as next described. To promote clarity, the description of the settling process will refer back to the elements shown and described above in conjunction with FIGS. 3 and 3A.

Within DMU 34, retrieve maximum and minimum transmit SUOC radio rates and corresponding powers that were computed by RFDGU 26 and input along line 30 at the end of the identification process.

DMU 34 makes a decision as to the type of probing process to use during the settling stage. The decision of DMU 34 as to which probing process to use can be determined either by default setting, user input (i.e. a control knob set by the user), or an internal process to the SUOC. One example internal process would provide a flag for reactive probing that is first alternated between 1 and 0 to allow the radio to try out the different types of probing procedures for different situations as characterized by the parameter information input along line 30, the grade, and the rate choice input along line 36. Then, after some large number of settling attempts, the DMU determines which procedure has been working better for each class of situation and sets the reactive probing flag to 1 if reactive probing has been working better than following the process started by not using reactive probing in the situation that best matches the one at hand.

Specifically, a probing determination method is determined within DMU 34. This probing determination method is then initiated within DMU 34 and the first result of which is the determination of the specific power to try for attempting communications in this targeted FUOC radio band at the desired rate.

DMU 34 outputs control information along line 40 to configurable radio 28 in the receive-SUOC radio transmitter. This control information contains instructions needed by the transmit-SUOC for the probe signal that it will need to transmit.

The technology for implementing the acquisition process required to provide the function of configurable radio 28 is known to those versed in the art of wireless communication systems.

The control signals may be transmitted wirelessly by the receive-SUOC radio and may be received by configurable radio 28 of the transmit-SUOC radio. This control signal tells the transmit-SUOC radio what it needs to transmit back to the receive-SUOC radio. The technology required to provide the function of this unit is known to those of ordinary skill in the art of wireless communication systems.

Configurable radio 28 within the transmit-SUOC transmits the probing signal as instructed by the control signal it has received from the receive-SUOC radio. The technology required to provide the function of this unit is known to those of ordinary skill in the art of wireless communication systems. During the probing/settling process, this probing signal is a signal that is perceived equivalently by the target-FUOC as an actual interfering communication signal would be perceived. Any signal appropriate for this purpose will suffice, to include a tone, a band of noise signal, a "dummy" communication signal that is a non-information bearing version of the anticipated communication signal (e.g. QPSK modulated by a training sequence or random bit stream.) The appropriateness of each type of probing signal will depend, at least in part, upon the FUOC waveform and receiver. If the SUOC radio possesses knowledge of the FUOC waveform and receiver (for example, the FUOC has been built to conform to the well known LTE standard) then the SUOC radio (DMU 34) could use this knowledge to guide the choice of the probing signal decision.

If the receive-SUOC radio is currently in the settling stage, RFSCU 26 within the receive-SUOC radio characterizes the target-FUOC signal in the presence of the transmit-SUOC's probing signal. RFSCU 26 passes characterizing information to RFDGU 26, DMU 34 and configurable radio 28 (e.g. via signal path 30).

The DMU 34 records and/or updates a data base that keeps track of characterizations of the target FUOC radio in the current settling process as well as characterizations of the target FUOC radio at the conclusion of the settling process. This information is used in future interactions with similarly characterized FUOC signals.

DMU 34 determines the next portion of the settling process from among the following options:
  1. request another rate/power option from RFDGU 26 to guide next decision for probing signal, and determine the next probing signal parameters, then proceed with 3 below;

2. use the next step in the power stepping list to determine the next probing signal parameters, then proceed with 3 below;
3. stop probing current target FUOC radio band and exit settling process with direction to enter communication state; or
4. stop probing current target FUOC radio band and exit settling process with direction to enter threatened state.

FIGS. 7 and 7A form a flow diagram which shows processing which can be used for either of the list-based settling methods. The difference between ignorant stepping probing and knowledge-based probing is encompassed by the different lists used for each of these methods. FIGS. 7 and 7A illustrates an exemplary procedure that a DMU (e.g. DMU 34 in FIG. 3) may implement for list-based stepping.

Referring now to FIGS. 7 and 7A, processing begins in processing block 90 in which episode parameters, features and/or descriptors are retrieved. Processing then proceeds to block 91 in which an ordered list of powers to step through is constructed. Processing then proceeds to processing blocks 92 and 93 in which an initialization process is performed and a probe signal with a selected power level is transmitted.

Processing then proceeds to decision block 94 in which a decision is made as to whether there has been a change in the target-FUOC. If no change is detected, then processing proceeds to decision block 95 in which it is determined as to whether a current power level allows a top choice target rate for the SUOC. If the current power level does not allow a top choice target rate for the SUOC, then processing proceeds to processing block 96 where the counter for a new power level is incremented and processing returns to processing block 93. The loop implemented by blocks 93, 94, 95, 96 is repeated until either a change in target-FUOC is detected in decision block 94 or a current power level allows a top choice target rate for the SUOC is detected in decision block 95.

If in decision block 94 a decision is made that there has been a change in the target-FUOC, then processing proceeds to processing blocks 97 and 99 (FIG. 7A) in which a change counter is implemented and the current SUOC power and corresponding rate that could be achieved in the presence of the target-FUOC with its most recent parameter values and MUD available in the receive-SUOC, the power-rate pair, is added to a list of potential power-rate pairs for the transmit SUOC. Processing then proceeds to decision block 100 (FIG. 7A) in which a decision is made as to whether the number of changes is less than a maximum allowable number of changes. If in decision block 100 a decision is made that the number of changes is less than the maximum allowable number of changes, then processing returns to processing block 96 and processing proceeds as described above.

If in decision block 100 a decision is made that the number of changes is not less than the maximum allowable number of changes, then processing proceeds to processing block 102 (FIG. 7A) where the power-rate pair are set to be the second to last values that were set on the potential power-rate pair list. Processing then ends.

If in decision block 95 (FIG. 7) it is determined that a current power level allows a top choice target rate for the SUOC, then processing proceeds to processing block 98 (FIG. 7A) where the power-rate pair are set the current values. Processing then ends.

A step by step example of the outcome of the procedure of FIGS. 7, 7A is next described in conjunction with FIG. 8.

FIG. 8 is an example scenario using an illustrative power list. The example illustrates a step by step list-based settling procedure and the outcome of each step for a fabricated case for which the maximum number of FUOC changes allowed is one. FIG. 8 shows that the FUOC will experience one change, after which, the SUOC and FUOC will have settled into a coexistence sharing of the same channel. Stated differently, FIG. 8 is an example of list-based stepping that makes use of a power list. It should be appreciated that the illustrative settling episode progression using a power list settling procedure of FIG. 8 is substantially the same independent of how the power list itself was generated.

1. The process begins by probing with lowest power level on the list (i.e. power level=Min Power
2. FUOC signal made no changes perceptible to SUOC receiver;
3. Determine Next Power by moving up the list one entry: power level=Power Lv. 2
4. FUOC signal made no changes perceptible to SUOC receiver
5. Determine Next Power by moving up the list one entry: power level=Power Lv. 3
6. FUOC signal has been observed by SUOC receiver to have changed
7. Fallback: This is the power level that is "settled" upon for communication state. In this case example, settled power level=Power Lv. 2.

It should be noted that the number of FUOC moves before a fallback is a parameter may be set within the cognitive radio—e.g. within a decision-making unit such as DMU 34 in FIG. 3. This may be done either prior to radio deployment and/or updated during operation by a control decision made within the SUOC radio.

FIG. 9 is a flow diagram of a procedure that further defines processing block 91 in FIG. 7 (i.e., FIG. 9 is a flow diagram of a method of constructing a power list to be used in the settling procedure or, stated differently, FIG. 9 illustrates a list building function). The portions of the diagram that are identified with reference numeral 111 correspond to a method for knowledge-based list building. Knowledge-based list building uses data collected from past interactions that the SUOC radio has experienced with FUOC radios that are described by past FUOC parameter values (pedigree) that resemble the current target-FUOC signal and scenario parameter values. The list building function as illustrated in FIG. 9 is capable of producing any type of list. Four different types of lists may be implemented by the procedure described in FIG. 9:

1. Simple list (no use of prior knowledge);
2. Knowledge-based Power Ordered;
3. Knowledge-based Most Frequently Occurring Power to Least Frequently Occurring Power; and
4. Knowledge-based Hybrid Most-Frequent First (X most frequent successful powers followed by the rest in ascending power order).

Referring now to FIG. 9, processing begins in decision block 104 in which a decision is made as whether ignorant stepping should be implemented. If a decision is made to implement ignorant stepping, then processing proceeds to processing block 106 in which a simple power list is created. Processing then ends.

If in decision block 104 a decision is made to not implement ignorant stepping, then a method for knowledge-based list building 111 as implemented by blocks 108-124 is used. The method for knowledge-based list building begins in processing block 108 in which all successful settling attempts (termed "events") with matching pedigrees are extracted from a knowledge base. Processing then proceeds to processing block 110 in which all the extracted events with rates that are too low or too high for current SUOC needs are removed, as well as all events that correspond to transmit-SUOC transmit power that exceeds the operationally capable or allowable SUOC transmit power.

Processing then proceeds to decision block 112 in which a decision is made as to whether knowledge based quantized steps or a hybrid most frequent first technique will be implemented. If in decision block 112 a decision is made to implement knowledge based quantized steps or a hybrid most frequent first technique, then processing proceeds to processing block 114 in which the remaining events are grouped according to those with similar power values, the average power value for that group is used as the power value representing that group. Then the power values are ordered from lowest power to highest power. Processing then proceeds to decision block 116 in which a decision is made as whether a hybrid most frequent first technique should be implemented. If in decision block 116 a decision is made to not implement a hybrid most frequent first technique, processing then ends.

If in decision block 116 a decision is made to implement a hybrid most frequent first technique, then processing proceeds to processing block 118 in which the number of events contributing to a single power value is counted. The low to high power list is augmented by adding a specified number of power values above the top value on the list. Add to the top of this list the power values associated with the most populous event-groups. The specified number of spots to add at the top of this list can be predetermined or learned by a DMU (e.g. DMU 34 in FIG. 3) or other portion of the cognitive radio over time from examination of historical data. Processing then ends.

If in decision block 112 a decision is made to not implement knowledge based quantized steps or a hybrid most frequent first technique, then processing proceeds to decision block 120 in which a decision is made as to whether a most frequent first technique should be implemented. If in decision block 120 a decision is made to implement a most frequent first technique, then processing proceeds to processing block 122 in which the remaining events are grouped according to those with similar power values, the average power value for that group is used as the power value representing that group. Then the power values are ordered from the most frequently occurring to the least frequently occurring. Processing then ends.

If in decision block 120 a decision is made to not implement a most frequent first technique, then processing proceeds to processing block 124 in which other options for how to make use of information stored in the knowledge base can be used. One example would be to create a power list by using the information that has been collected in the knowledge base by finding only those events that match the current situation in one or two features as opposed to being a good match in all features (as what is meant by the term "pedigree"). For example, the list of powers could be the list of powers that were settled in past events for which the pedigree is a good overall match, but the time of day is the best match. So the first (second, third) power on the list would be the power that was settled into at the time of day that is closest (second closest, third closest) to the current time of day for all events in the knowledge base that are a good overall match in pedigree to the current situation.

Figure 10:
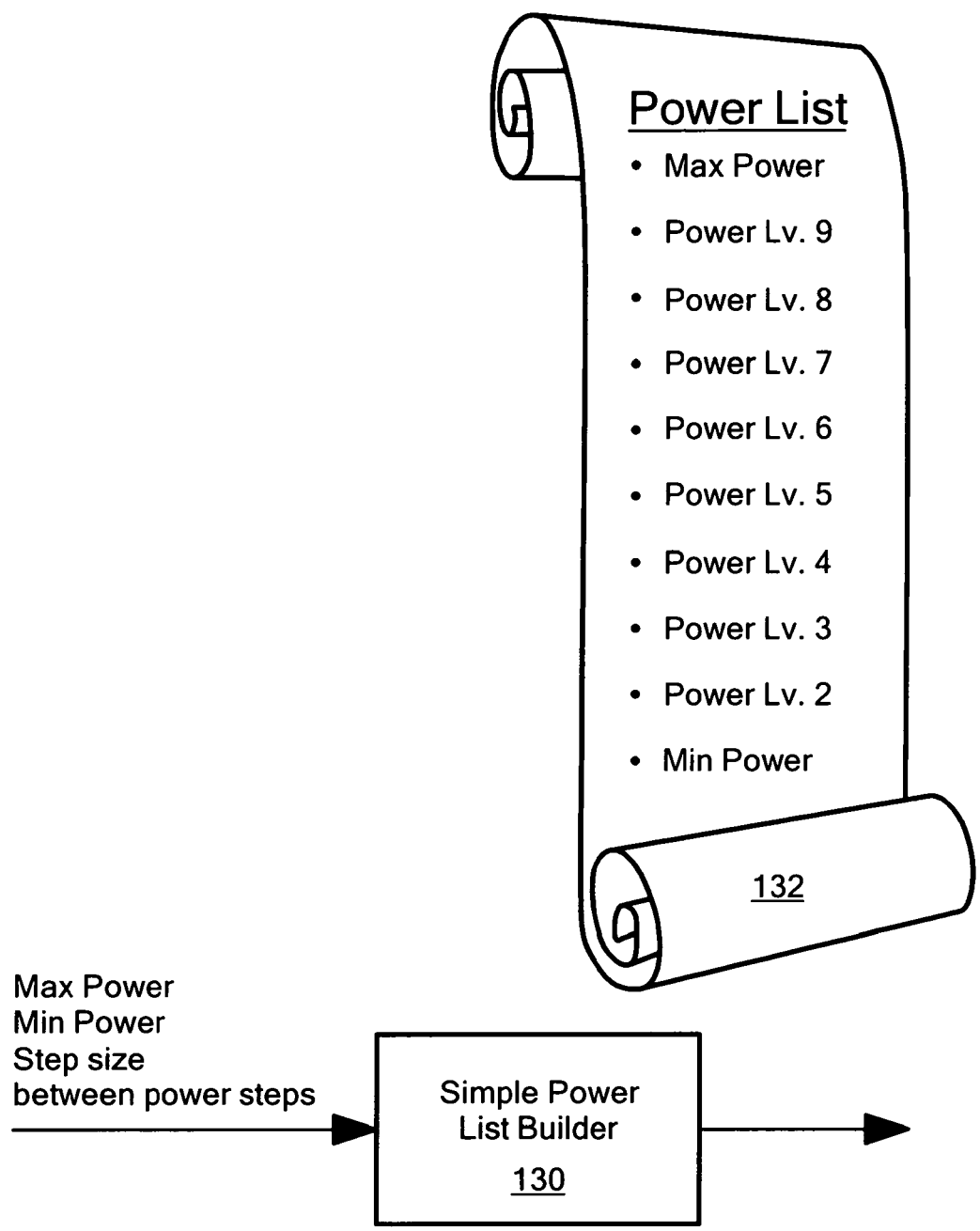
FIG. 10 is a diagram of an ignorant list building procedure.

Referring now to FIG. 10, a list builder apparatus 130 which may be included in a cognitive radio and that may reside, for example, within a DMU (e.g. such as DMU 34 in FIG. 3) to implement the simple list building function identified as element 106 in FIG. 9. A sample power list 132 includes a list of powers listed from a maximum power level to a minimum power level.

Figure 11:
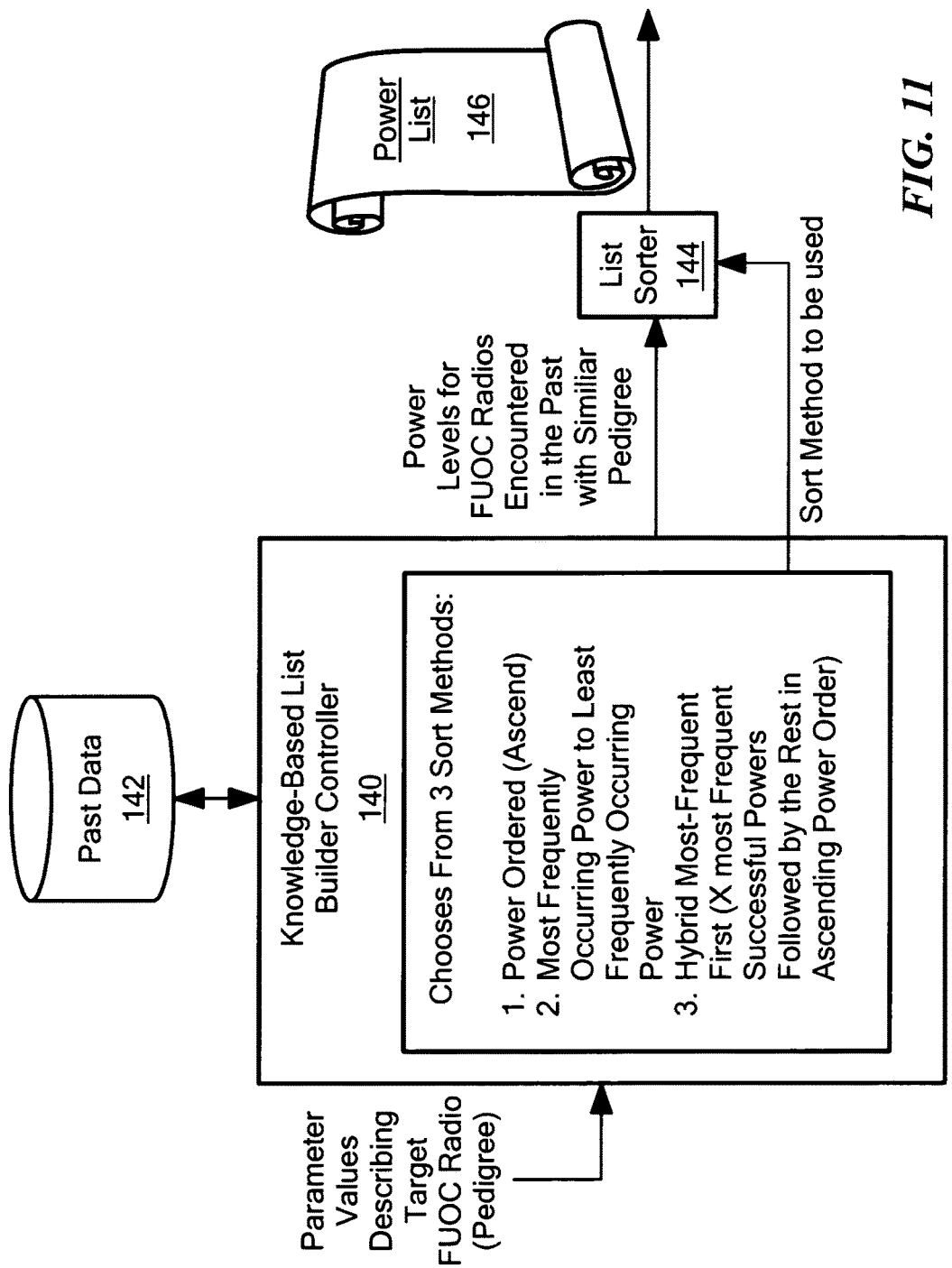
FIG. 11 is a block diagram illustrating an example of knowledge base power list building.
Figure 12:
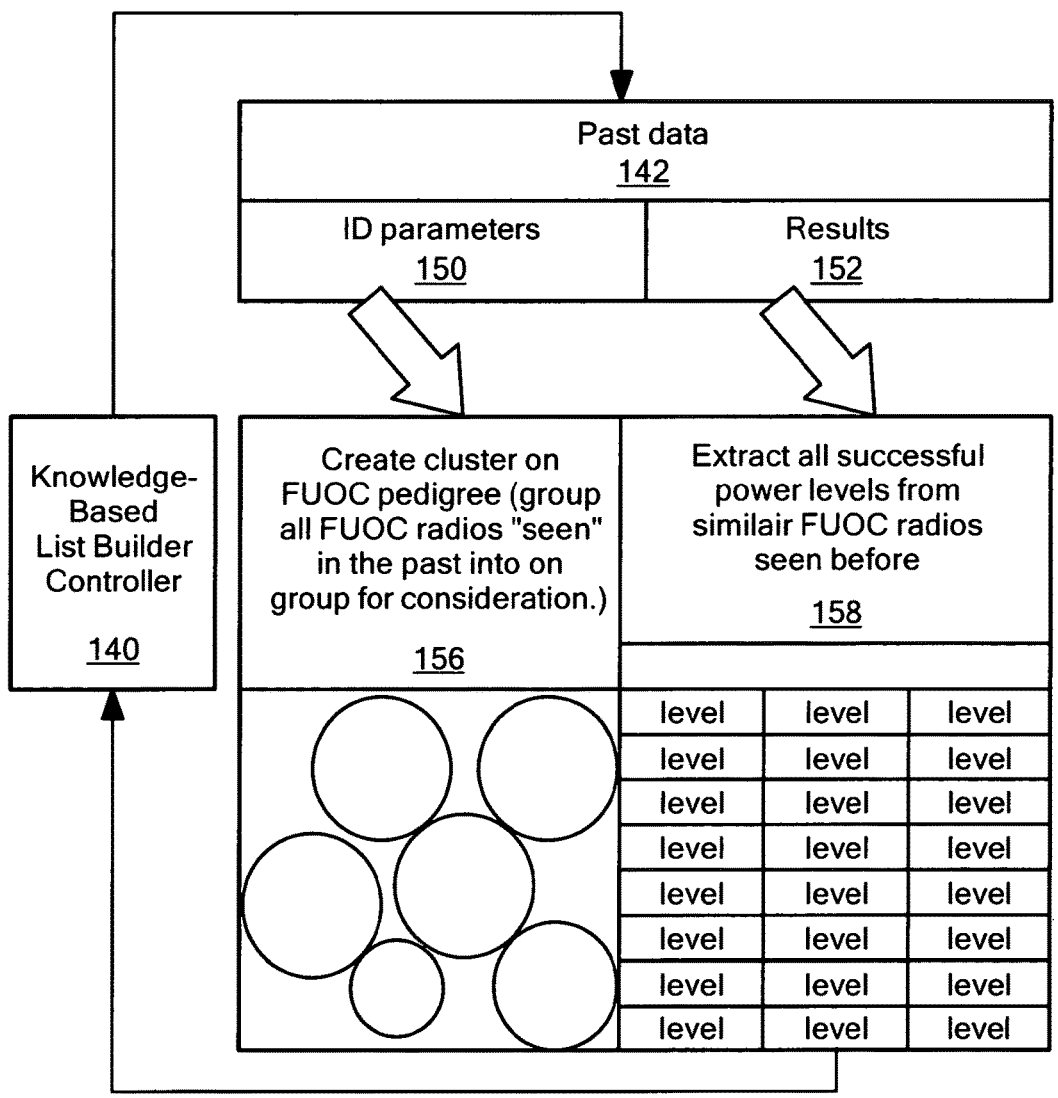
FIG. 12 is a block diagram illustrating interaction between a knowledge base list builder controller and a database.

FIGS. 11 and 12 illustrate a system which provides a knowledge-based type of list building and provide a description of the knowledge based-sorting apparatus and operation that implements the techniques described within block 111 in FIG. 9.

Referring first to FIG. 11, a knowledge-based list builder controller 140 (or more simply "knowledge list controller 140") is coupled to a data store 142 (e.g. database) having past data stored therein and a list sorter 144. Knowledge list controller 140 receives parameter values describing target-FUOC signal and scenario information (e.g. pedigree information) and also exchanges data with data store 142. In response to the information provided thereto, knowledge list controller 140 provides to list sorter 144 power levels for FUOC radios encountered in the past with similar pedigree and also one or more sort methods to be used. In response thereto, list sorter 144 generates a power list 146.

Referring now to FIG. 12 in which like elements of FIG. 11 are provided having like reference designations, knowledge list controller 140 is coupled to data store 142 which includes ID parameters 150 and results 152. The ID parameters 150 contain target-FUOC pedigree parameters (including, but not limited to FUOC identifiers and frequency). A results portion 152 of data store 142 contains results from past settling attempts with each FUOC (including but not limited to final successful SUOC power, rate, other settling process and/or outcome details, etc.). The ID parameters are used to generate clusters on FUOC pedigree 154 and the results 152 are used to extract all successful power levels from similar FUOC signals and scenarios seen before 158.

As mentioned above, reactive stepping is a third method that may be used in a settling process and can be described at the highest level with two instructions: (1) after each interaction round within the settling process, re-evaluate the transmit-SUOC's probing signal power and possibly calculate a new value to use in a next interaction; and (2) iteratively adjust this transmit power until a high rate falling between a maximum desired rate ($R_{a,max}$) and a minimum acceptable rate ($R_{a,min}$) has been achieved without causing more than a previously designated number of negative changes in the target-FUOC's signal.

Some details of illustrated techniques to perform a reactive stepping settling procedure were described above.

Another reactive-type probing procedure is detailed below. This is different than the reactive probing procedure discussed above and is called the guided step probing procedure. Similarly to the reactive probing procedure, the guided step probing technique involves determining the SUOC operation point by observing the FUOC's response to a probe signal. However this procedure utilizes a two phase process to first heuristically determine a target transmit-SUOC rate and second to analytically determine a transmit-SUOC receive SNR level that allows for achievement of that rate. This process is iterative, converging to a solution after a few probing interactions. This guided stepping settling process takes the approach of entering the target-FUOC's channel with a minimum power level and building up to a higher power level as is possible given any changes that occur in the FUOC's modulation rate and/or power during this settling process. The guided step probing procedure is described below.

Step 1: Initialize three regions of rate values to be used in the guided step settling process. Two rates, one the excessive rate, the other the minimum rate, provide the separating values for three rate regions: the Achieve Minimum region, the Joint Consideration region, and the Excessive region. The Achieve Minimum region contains all rates less than the provided minimum. The Joint Consideration region contains rates between the two given levels of minimum rate and excessive rate. The Excessive region contains rates greater than the excessive level. The excessive rate level is predetermined as the maximum rate that would be required by a SUOC to fully achieve the target application (e.g. voice, video) with the best quality possible. The minimum rate level is predetermined as the minimum rate that would be required by a SUOC to acceptably achieve the target application (e.g. voice, video) with the lowest quality allowable.

Step 2: Initialize an upper and lower rate bound that will change iteratively in response to the guided stepping and any changes in the target-FUOC SNRA and modulation. The bounds guide the development of transmit-SUOC target rate determination. The bottom bound is initially set to the minimum rate level and the top bound is initially set to the excessive rate level.

Step 3: Determine the first value for the previously determined achievable transmit-SUOC rate that is used in the guided stepping settling process. First, a DMU (such as DMU 34 in FIG. 3, for example) submits a request to an RFDGU (such as RFDGU 32, for example) for the RDFGU to compute the transmit-SUOC SNRa that would be needed to achieve the minimum acceptable transmit-SUOC rate which has been pre-determined as part of the specification of the SUOC radio for each data payload type. The current target-FUOC SNRA and modulation is preferably also be passed to RDFGU in order for the RDFGU to compute the necessary SNRa that would support the minimum acceptable rate. Second, the transmit-SUOC transmits a probe signal at the power necessary to result in the determined SNRa that corresponds to the minimum acceptable rate to be achieved at the receive-SUOC. If the transmit-SUOC's signal interferes with the FUOC in any way, the FUOC will make some form of adjustment at this time to overcome the degraded signal quality due to the new level of interference. Third, the DMU submits a request to the RFSCU to provide estimates of the target-FUOC modulation and SNRA. Fourth, with these values for the target-FUOC SNRA and modulation (and if applicable, combined coding and modulation rate), the DMU submits a request to the RDFGU to request the transmit-SUOC achievable rate with the MUD available in the receive-SUOC. It is this value that is used as the first value for previously determined achievable rate in the guided stepping process.

Step 4: The top and bottom bounds are adjusted according to the following rules: A) if the previously determined achievable rate is in an achieve minimum region, the new target rate is the current bottom bound. If the previously determined achievable rate is in an excessive region, the new target rate is the current top bound. B) If the previously determined achievable rate is in a joint consideration region, the new target rate is a weighted average of the top and bottom bound. C) If the previously determined achievable rate is greater than the midpoint of the top and bottom bounds, the bottom bound is adjusted to a scaled version of the previously determined achievable rate. The top bound is adjusted in a similar fashion if the previously achieved rate is less than the midpoint of the bounds.

Step 5: A new SUOC target rate is determined based on the previously determined achievable rate, a given excessive rate level, a given minimum level, a top bound, and a bottom bound. The previously determined achievable rate is defined to be the last achievable rate from this iterative guided stepping settling process that was confirmed to be implementable with the given MUD, as determined by the RDFGU based upon the most recent SRNa, SNRA, and FUOC modulation (or, if the receive-SUOC has access to the FUOC's code book and can implement the additional error correction decoder, then the FUOC's rate would be the combination of the modulation and code rate) values. The new SUOC target rate could be determined in any number of ways, to include the following: the midpoint between the top and bottom bounds, a weighted average of the top and bottom bounds, a value that falls between the top and bottom bounds by some fraction, etc.

Step 6: Determine the next transmit-SUOC probing power. This new SUOC target rate is fed to the RDFGU along with the current values of FUOC SNRA and modulation and a request to return the SNRa necessary to achieve this target rate with the given MUD. The DMU computes the transmit-SUOC transmit power that corresponds to the SNRa value returned by the RDFGU and sends the necessary control signals to a communication system radio with a MUD receiver (such as configurable radio 28 in FIG. 3, for example) to accomplish the next step in this process.

Step 7: The transmit-SUOC transmits a probe signal at the power necessary for the most recently computed target transmit-SUOC rate to be achieved at the receive-SUOC with the given MUD. If the transmit-SUOC's signal interferes with the FUOC in anyway, the FUOC will adjust at this time.

Step 8: Determine the next value of the previously determined achievable rate. The DMU submits a request to the RFSCU to provide estimates of the FUOC modulation (or combination of modulation and rate) and SNRA. With these values for the FUOC SNRA and modulation (or combination of modulation and rate), the DMU submits a request to the RDFGU to request the achievable rate possible with the MUD available in the receive-SUOC. It is this value that is used as the next value for the previously determined achievable rate in the guided stepping process.

Step 9: Log any condition parameters at this time. If a pre-determined condition is met, stop the guided stepping settling process and transition the receive SUOC into the communication state. Otherwise, continue this process by going to step 4.

Note that a slight variation in this guided stepping settling process can be achieved by a simple change in the step to determine the first power used for transmit-SUOC probing. During the first probe transmission by the SUOC, an initial power level is used for this calculation. This initial power could simply be the typical operating power of the transmit-SUOC or it could be either a value derived from the knowledge base based upon historically good first values or could be a pre-determined initial power or initial pro-rating of the typical power to allow for a gentler settling process with the FUOC.

Figure 13:
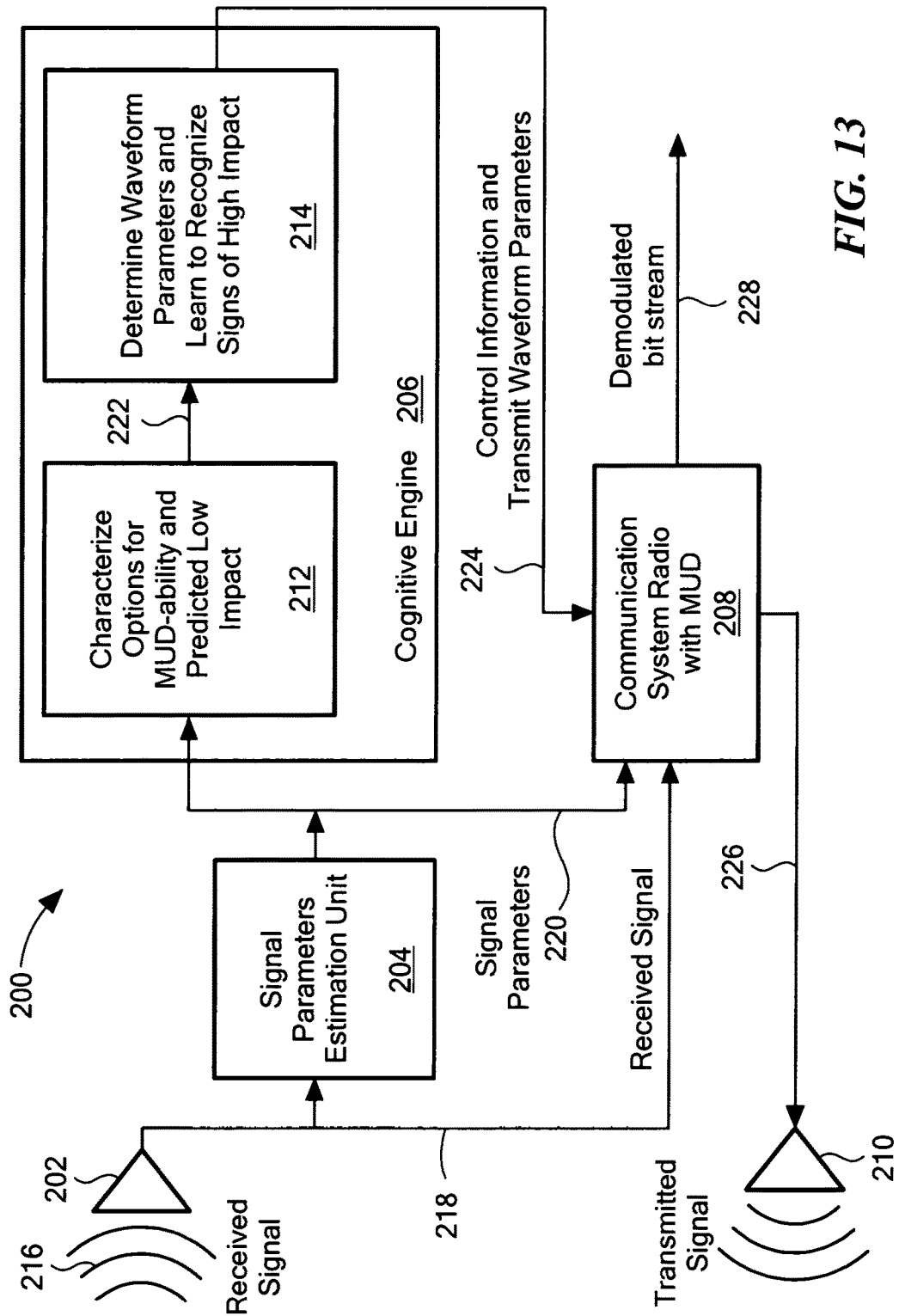
FIG. 13 is a block diagram of an illustrative cognitive transmit-receive system.

Referring now to FIG. 13, an illustrative transmit-receive system 200 which may be the same as or similar to the system 19 described above in conjunction with FIG. 3, includes a receive antenna system 202 coupled to a signal parameter estimation unit 204 (or more simply "estimation unit" 204); a cognitive engine 206 coupled to the estimation unit 204; a configurable radio 208 coupled to the estimation unit 204, the cognitive engine 206, and the receive antenna 202; and a transmit antenna system 210 coupled to the configurable radio 208. The illustrative cognitive engine 206 includes a characterization/prediction unit 212 and a decision-making unit 214, as shown. Configurable radio 208, which may be the same as or similar to radio 28 of FIG. 3, includes a receiver and a transmitter. In various embodiments, the receiver is a multiuser detection (MUD) receiver. It will be appreciated that portions of the system 200 may be the same as or similar to portions of the system described above in conjunction with FIG. 3 and also described above in connection therewith.

In operation, receive antenna 202 receives or measures electromagnetic signals (or waves) 216. Upon receiving/measuring the electromagnetic signals, the receive antenna system 202 generates a received RF signal and provides the received RF signal via a signal path 218 to the estimation unit 204 and to the configurable radio 208. The estimation unit 204 processes the received signals to provide output data including, but not limited to signal parameters associated with the received signals. Such signal parameters may include, for example, a carrier frequency, a band that corresponds to a unique FUOC transmitted signal (also referred to as a target FUOC), and one or more of the following parameters associated with each target FUOC: received signal power, received signal modulation type (e.g. QPSK), error correction coding type, received signal signature pulse, timing offset relative to reference, received phase and/or frequency offsets relative to reference, code rate, baud rate and/or symbol duration, channel transfer function and/or multipath characterization of channel, bandwidth, and noise power.

As used herein, the term "rate" is any suitable measure or estimate of the amount of information conveyed within a signal over time. For example, a FUOC's rate can be determined in several different ways. In a simple case, the FUOC's modulation rate can be used as a measure of its rate. If the FUOC's code book is known, the rate may be determined as a combination of the FUOC's modulation rate and the FUOC's known coding rate. If the FUOC is known to use concatenated codes and the SUOC is not able to decode all the individual codes that make up a concatenated code, the rate can be estimated based upon the modulation rate and the coding rates of only the known codes. If the SUOC has MUD capabilities, the SUOC can decode some/all of the known codes as part of an iterative MUD procedure and determine the FUOC's rate based on the code intended to be used in the MUD receiver.

In at least one embodiment, both the estimation unit 204 and the configurable radio 208 include a typical radio front-end to downconvert and process received RF signals. In some embodiments, both the estimation unit 204 and the configurable radio 208 may each use the same front-end circuitry. In some embodiments, a sliding filter may be provided as part of front-end circuitry to observe different RF bands one at a time in the estimation unit 204. In some other embodiments, a wideband front-end may be used to capture signals within multiple (or all) of the RF bands at the same time.

The estimation unit 204 is capable of sensing and characterizing all or part of an RF spectrum that is potentially available for use by a SUOC radio. For each block of spectrum under examination of this unit, the estimation unit 204 measures and/or estimates each band of spectrum that is associated with a single RF system, link, and/or radio, as well as other signal parameters that are needed for operation of a coexistence cognitive radio or a system which includes or utilizes a coexistence cognitive radio or any related coexistence cognitive radio techniques. As described above, such signal parameters may include, but are not limited to: received signal power, noise power, received signal signature pulse shape (e.g. root raised cosine), received signal modulation type (e.g. QPSK), timing offset relative to reference, received phase offset relative to reference, baud rate and/or symbol duration, error correction coding type, code rate, channel transfer function and/or multipath characterization of channel.

For a frequency-division multiple access (FDMA) system, there is typically a single link associated with each band and, therefore, it is not necessary to associate signal parameters with each transmitter/receiver pair. However, in this case of frequency hopping or time-division multiple access (TDMA), it may be necessary to "label" signal parameters to track which transmitter/receiver link pair those signal parameters are associated with. Thus, in some embodiments, signal parameter information may include link labels and, in other embodiments, signal parameters information may include transmitter/receiver pair labels.

The signal parameters are received by the characterization/prediction unit 212 and by the configurable radio 208 via a signal path 220. The characterization/prediction unit 212 characterizes the different opportunities for the SUOC to establish coexistence with a plurality of occupied FUOC channels. For each target FUOC identified by the estimation unit 204, the characterization/prediction unit 212 determines SUOC recommended power and rate, and/or a grade, or set of powers and rates, and/or a set of grades using the techniques described above in connection with RFDGU 32 of FIG. 3.

In various embodiments, characterization/prediction unit 212 generates an ordered list of target FUOCs. In some embodiments, the ordered list of target FUOCs may be generated by another portion of system 200 or even outside of system 200. The list may be ordered based upon whether the SUOC can coexist in a given FUOC channel while achieving one of two possible goals: (1) a "selfish" goal of achieving a desired SUOC rate; and (2) an "altruistic" goal of causing a low impact (i.e., a relatively small degradation of performance) in the FUOC, where a "low impact" can be quantified in terms of one or more design parameters. The second goal is sometimes referred to as a so-called "play nice" approach. Illustrative techniques for generating an ordered list of FUOCs according to these goals are described below in conjunction with FIGS. 14A-18.

The decision-making unit 214 receives signal characterization information from the characterization/prediction unit 212 via the signal path 222 and signal parameters from the estimation unit 204 via the signal path 220. Such information may include an ordered list of target FUOCs and a set of rates for the transmit-SUOC to coexist in the presence of each target FUOC signal. In addition to, or in place of the above, the signal characterization information may include an acceptable max rate, a min rate, and/or other rate possibilities corresponding to coexistence with each target FUOC. Also, if the SUOC has more than one MUD it can use, then there would be a rate or set of rates that correspond to each MUD.

The decision-making unit 214 or other portions of cognitive engine 206 uses the received information to determine the best action for the transmit SUOC radio. This includes selecting a FUOC channel or link that corresponds to a specific FUOC transmit/receive pair with which the SUOC should try to coexist, along with corresponding waveform parameters, including but not limited to carrier frequency, bandwidth, power, and rate (bits per symbol or channel use, bits per second, or bits per second per Hertz). In some embodiments, the decision-making unit 214 monitors FUOC signals to recognize signs of high impact on a FUOC (where "high impact" is a design parameter for achieving the "play nice" goal). Using the ordered list of target FUOCs, the decision-making unit 214 can iteratively select FUOCs to try and monitor the impact on each FUOC while the SUOC co-occupies or probes the FUOC channel. To increase the likelihood of quickly finding a suitable FUOC channel, the list of FUOCS may be ordered, at least in part, based upon a predicted impact, as described below in conjunction with FIGS. 14A-18.

The decision-making unit 214 may provide one or more of control information, feedback information, and/or request additional information from the estimation unit 204 and/or characterization/prediction unit 212 via one or more signal paths (not shown). Such information flows and related techniques are described above (e.g. in connection with RFCU 26, RDU 32 and DMU 34 of FIGS. 3 and 7.

Configurable radio 208 receives decision information from the decision-making unit 214 via a signal path 224. In that respect, the decision-making unit 214 instructs or otherwise communicates to radio 208 which target FUOC a SUOC should co-occupy a channel with, along with specific parameters that define the transmit-SUOC waveform to include rate, as well as the transmit power to be used by the transmit-SUOC. The configurable radio 208 also receives signal parameters from the signal parameter estimation unit 204 and electromagnetic signals (or waves) 216 from the receive antenna 202 (via the receiver-front end which is not shown). In response to the received information, the configurable radio 208 provides an RF signal at a first output coupled to the transmit antenna 210 via a signal path 226. It should be appreciated that transmit antenna system 210 and receive antenna system 202 may share the same antenna (i.e. as is known to those of ordinary skill in the art, receive antenna and transmit antenna of the receive and transmit system may be the same physical structure). At a second output, the configurable radio 208 provides a digital stream of bits (a "bit stream") demodulated and decoded from a transmit-SUOC signal of interest along signal path 228. These are the decoded bits associated with the transmission from the transmit-SUOC radio of interest to this receive-SUOC radio.

It should be appreciated that illustrative transmit-receive system 200 is capable of sensing the available spectrum and determining good candidate FUOC user channels, bands, and/or time slots in which this SUOC system could successfully communicate given the MUD available on the SUOC radio. This determination is based in part on pre-coexistence information (e.g., FUOC powers and rates before the SUOC begins transmitting in the FUOC channel allows the system 200 to predict impact the SUOC would have on a target FUOC if the SUOC were to co-occupy the FUOC's channel) as well as post-coexistence information (e.g., powers and rates after SUOC transmits in the FUOC channel allows for the system 200 to observed impact the SUOC's interference has on the FUOC). The system 200 is capable of iterative transmission/probing, sensing, learning, and decision making, to bring about an acceptable communication rate for the SUOC and an acceptable degradation or impact in link quality and/or performance to the FUOC systems so that they both can utilize the same frequency band for communication.

Figure 14A:
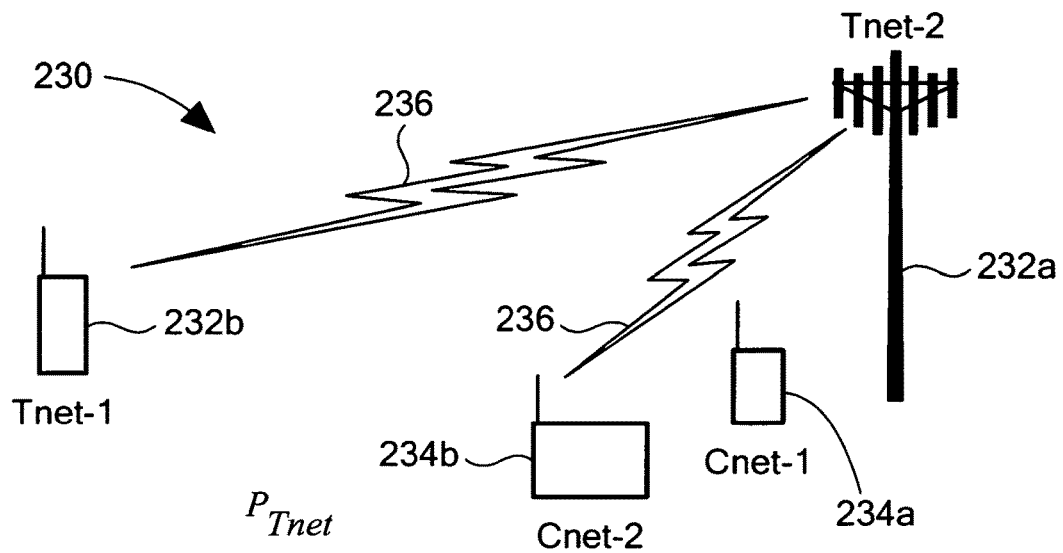
FIGS. 14A and 14B are diagrams illustrating various operational scenarios for a cognitive system.

Referring now to FIG. 14A, an illustrative operational scenario 230 includes a plurality of nodes 232a, 232b, 234a, and 234b. Those of ordinary skill in the art will appreciate that the concepts and techniques sought to be protected herein are not limited to a network having a particular number of nodes, with four nodes being shown here to promote clarity. In this example, the nodes 232a and 232b correspond to a FUOC and the nodes 234a and 234b correspond to a SUOC. Each of the nodes includes a radio transmitter and/or receiver. The SUOC nodes 234a, 234b include coexistence cognitive radios, such as the transmit-receive system 200 of FIG. 15. In certain embodiments, the FUOC nodes 232a, 232b possess the means to adapt to the RF environment in which they are operating. In some embodiments, the FUOC nodes 232a, 232b include coexistence cognitive radios.

The node 232a (the "FUOC transmitter") transmits a signal 236 to the node 232b (the "FUOC receiver") in a free-and-clear channel. Thus, it can be said that the FUOC occupies the channel. As shown, the SUOC nodes 234a, 234b are located relatively close to the FUOC transmitter 232a compared to the FUOC receiver 232b. In this example, the SUOC wants to communicate between nodes 234a and 234b (in either direction or in both directions). By definition, a SUOC user intends to find and co-occupy the same band at the same time as a FUOC user.

It is understood that, as the distance between the FUOC transmitter 232a and the FUOC receiver 232b increases, the power of signal 236 received by node 232b decreases. Moreover, the rate of the signal 236 must also decrease (otherwise the FUOC receiver 232b could not decode the information in the signal). It is further understood that, as the distance between the FUOC transmitter 232a and a SUOC node 234a and/or 234b decreases, the power of FUOC signal 236 as seen by the SUOC node increases, whereas the rate of signal 236 as seen by the SUOC node remains unchanged. Thus, a relatively large discrepancy between the power and rate of signal 236, as seen by a SUOC node, can be used to infer that the SUOC node is located relatively far from the FUOC receiver. Similarly, signal paths with obstructions such as walls will also result in a lower received power, so even if the FUOC and SUOC nodes are in the same vicinity, a discrepancy in received power and rate could indicate that there is a barrier between them, and the effect is the same as if they were far apart.

The SUOC nodes 234a, 234b (i.e., coexistence cognitive radios included therein) choose an occupied channel over which to communicate. In addition to using the techniques described above in connection with FIGS. 1-13, the nodes may also predict the impact on the FUOC so as achieve the "altruistic" goal of not causing excessive harm to a FUOC.

According to some embodiments, the SUOC takes advantage of a discrepancy (preferably a relatively large discrepancy) between the actual rate at which the FUOC is transmitting (referred to herein as the "actual FUOC rate") and the rate at which the FUOC could transmit to the SUOC receiver (referred to herein as the "possible FUOC rate"). A SUOC node can analyze the received FUOC signal to determine the actual FUOC rate, bandwidth, signal power, noise power, and any other desired signal parameters. Using the signal parameters, a SUOC node can derive the possible FUOC rate.

The possible FUOC rate can be determined in several different ways. According to one illustrative embodiment, the possible FUOC rate is related to the theoretical channel capacity (i.e., the Shannon channel capacity). In another illustrative embodiment, the possible FUOC rate is defined in terms of an achievable rate, which is the mutual information between what is sent and what is measured at the receiver. In contrast to the theoretical channel capacity, this measurement does not consider the maximum of the mutual information over all distributions of the code book that could be used at the receiver. Instead, the achievable rate takes into account what the actual code book and modulation scheme is. It will be understood that such an achievable rate generally provides a tighter bound compared to the theoretic channel capacity. According to another illustrative embodiment, the possible FUOC rate is based upon predefined lookup tables stored in the radio. For example, a lookup table could provide a list of modulation schemes and code rates to use for a given signal-to-noise ratio; knowing the signal-to-noise ratio of the FUOC signal as it is seen at the SUOC receiver, a SUOC node could use such a table to determine the possible FUOC rate. Any other suitable technique known in the art for determining an possible FUOC rate (i.e., for determining a rate that is more likely to match the rate the FUOC system would choose for its own links of similar SNR quality) can be used by a SUOC to determine the expected impact.

Having determined an actual rate and a possible rate for each FUOC, the SUOC can determine a corresponding expected impact on the FUOC if the SUOC were to coexist in the FUOC channel. In general, a large discrepancy between the actual and possible FUOC rates is a good indicator that the intended receiver (i.e., the FUOC receiver) is located relatively far away (either physically or just in the path-loss sense), from the FUOC transmitter and that the SUOC nodes are located relatively close to the FUOC transmitter. In this case, the FUOC receiver is effectively shielded from the SUOC nodes meaning that any low power transmissions from the SUOC node will appear as very low levels of interference received with negligible power at the FUOC receiver. Accordingly, the SUOC nodes can co-occupy the FUOC's channel and will likely not cause significant interference at the FUOC receiver.

In some embodiments, a SUOC transmitter node could rely upon other SUOC nodes in its network for information such as the received FUOC power, and even the determination of rate and other FUOC signal parameters. The significance of being nearby is that these nearby helper nodes will have the same physical situation as the SUOC, so what they "see" is relevant to the SUOC. This permits robust operation of a cognitive coexistence network even for the case where only a portion of the nodes possess the functionality enabled by system 200 and the other nodes are directed or "helped" to know what to do by the more capable nodes. Distant nodes could also be helpers, but what they see is less relevant to the SUOC.

Figure 14B:
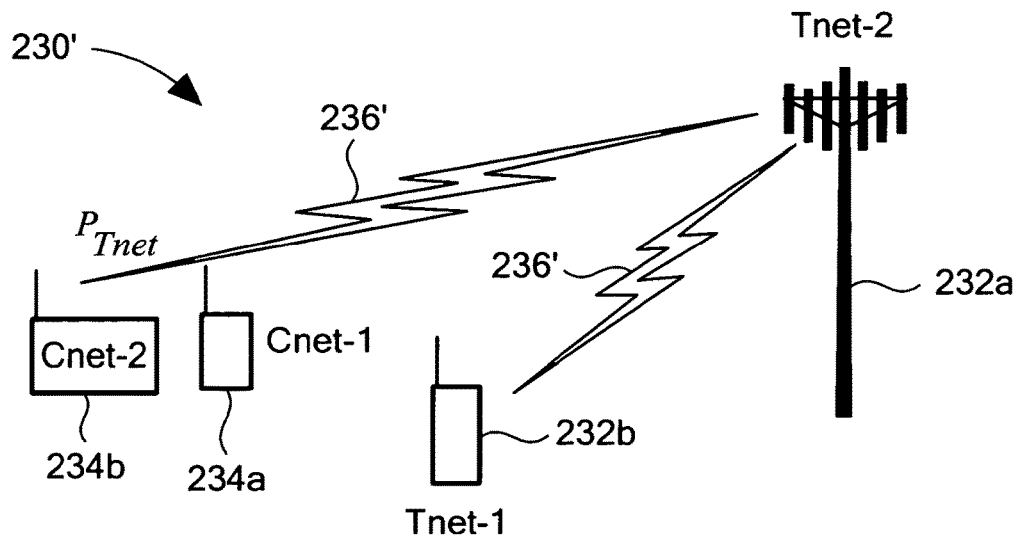

Referring now to FIG. 14B in which like elements of FIG. 14A are provided having like reference designations, another illustrative operation scenario 230' is shown. In contrast to the scenario in FIG. 14A, the SUOC nodes 234a, 234b in FIG. 14B are located relatively far from the FUOC transmitter 232a compared to the FUOC receiver 234b. The FUOC transmitter 232a transmits an RF signal 236' to the FUOC receiver 232b. The SUOC nodes 234a, 234b will measure a relatively low power and a relatively high actual rate for the signal 236'. Using received signal parameters, a SUOC nodes 234a, 234b can derive an possible FUOC rate, as described above in conjunction with FIG. 14A.

In this example, the actual FUOC rate will be much greater than the derived possible FUOC rate (where "much greater" can be quantified in terms of a design parameter). Based on this discrepancy, the SUOC can predict a low impact on the FUOC if the SUOC were to coexist in the FUOC's channel. Thus, in FIG. 14A, the actual FUOC rate is much less than the possible FUOC rate and in FIG. 14B, the actual FUOC rate is much greater than the possible FUOC rate (again, where "much less" and "much greater" can be quantified in terms of design parameters). In either case, the SUOC can predict a "low" impact on the FUOC.

Figure 15:
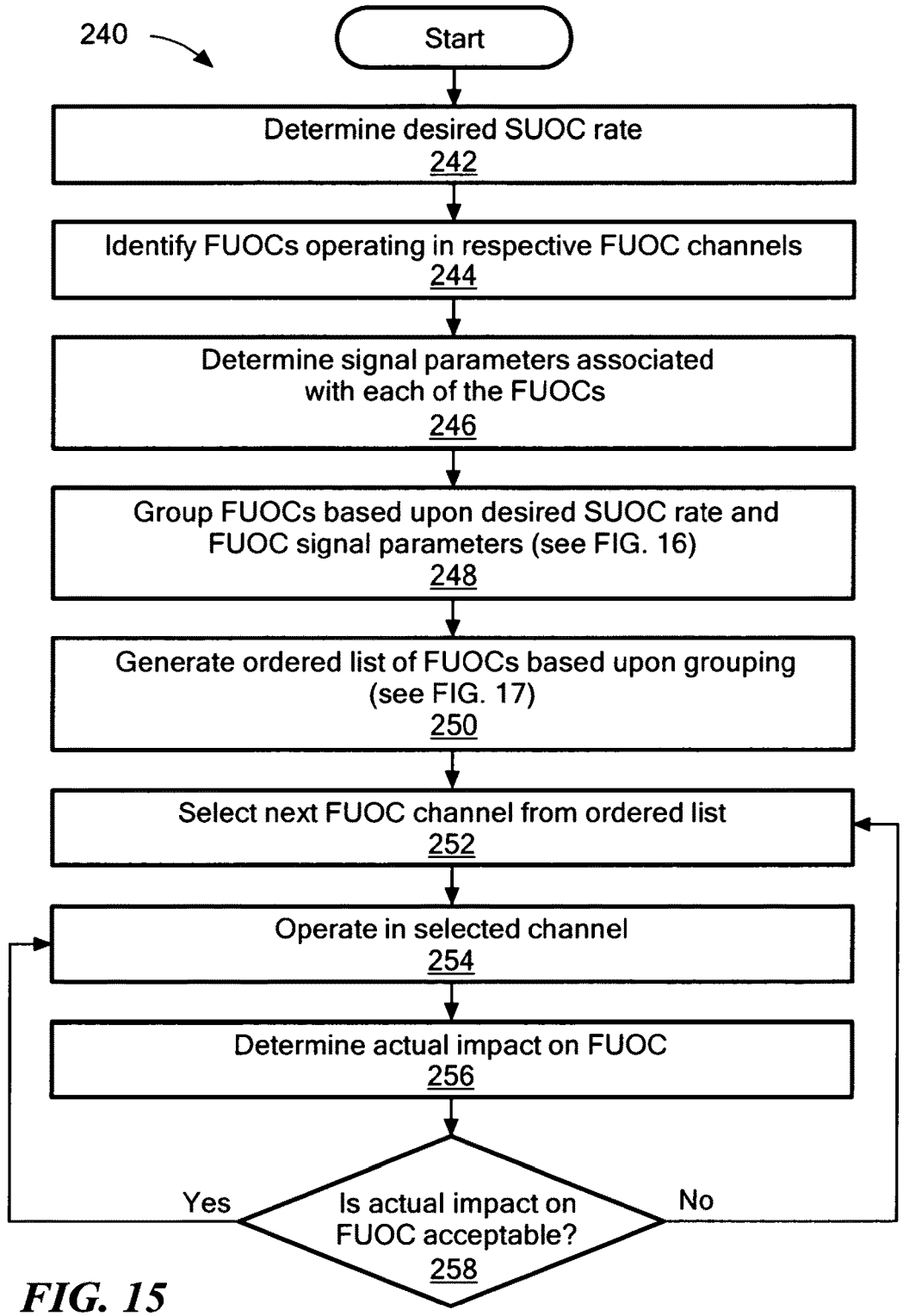
FIG. 15 is flow diagram illustrating a process for use with a system which may be the same as or similar to the systems of FIGS. 3 and 5.

Referring now to FIG. 15, an illustrative method 240 may correspond to processing performed within a coexistence cognitive radio, such as one of the transmit-receive systems described above in conjunction with FIGS. 3 and 13. The rate may be determined using a technique described herein or may be specified (e.g. by a user) or may be determined from system parameters) or otherwise provided. At block 242, a desired SUOC rate is determined.

At block 244, one or more target FUOCs are identified and, at block 246, various signal parameters are determined for each FUOC. For example, an estimation unit (e.g., estimation unit 204 of FIG. 13) may sense all or part of an RF spectrum that is potentially available for use by the SUOC radio. For each block of frequency spectrum under examination, the estimation unit 204 can measure and/or estimate each frequency band of spectrum that is associated with a single RF system and/or radio (i.e., a FUOC transmitter), as well as other signal parameters needed to characterize the different opportunities for the SUOC to establish coexistence with the FUOC. Non-limiting examples of signal parameters that may be determined for each FUOC include: an actual code rate, an actual modulation rate, a bandwidth, a received signal power, and a noise power. In some embodiments, for each target FUOC, the determined signal parameters include signal parameters required to determine: (1) the actual rate at which the FUOC is operating; (2) the possible FUOC rate (a concept which is described above in conjunction with FIG. 14A); and (3) the maximum possible rate that the SUOC could operate at when co-occupying the FUOC channel, given the actual FUOC rate. In some embodiments, the actual FUOC rate, the possible FUOC rate, and the possible SUOC rate can be determined using only received FUOC signal power. In some embodiments, FUOC actual rate and/or the FUOC modulation scheme are obtained using signal processing of the received signal that is capable of identifying the code rate and/or the modulation rate.

Figure 17:
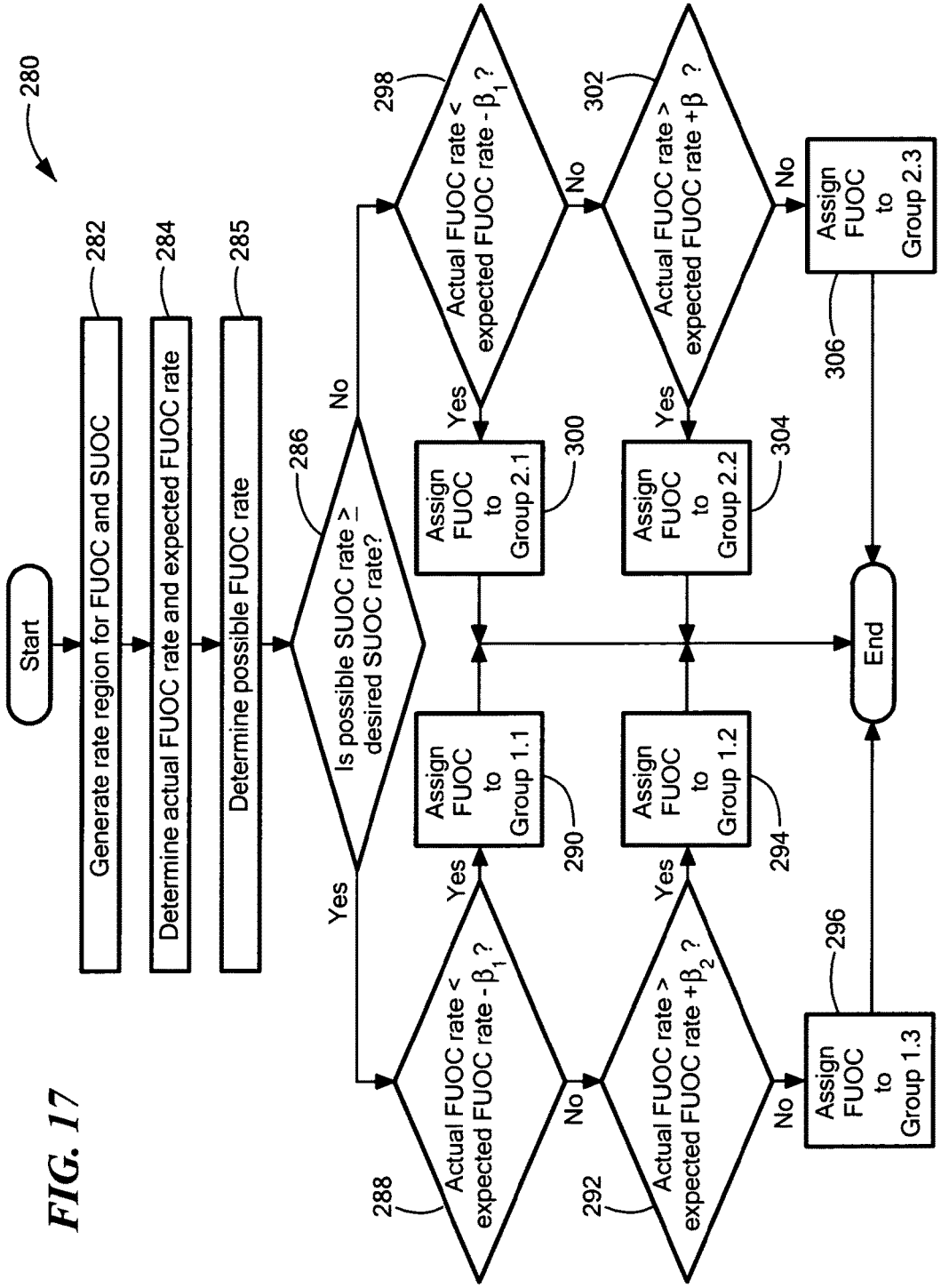
FIG. 17 is flow diagram illustrating processing that may form part of the method of FIG. 15.

At block 248, the FUOCs are organized into two or more groups based, at least in part, upon information determined in blocks 242-246. In some embodiments, each of the target FUOCs is assigned to one of six (6) possible groups based upon whether the SUOC can achieve a selfish goal coexisting with the FUOC and/or the expected impact upon the FUOC if the SUOC were to coexist in its channel. FIG. 17 shows an illustrative method that may correspond to the processing of block 248.

Figure 18:
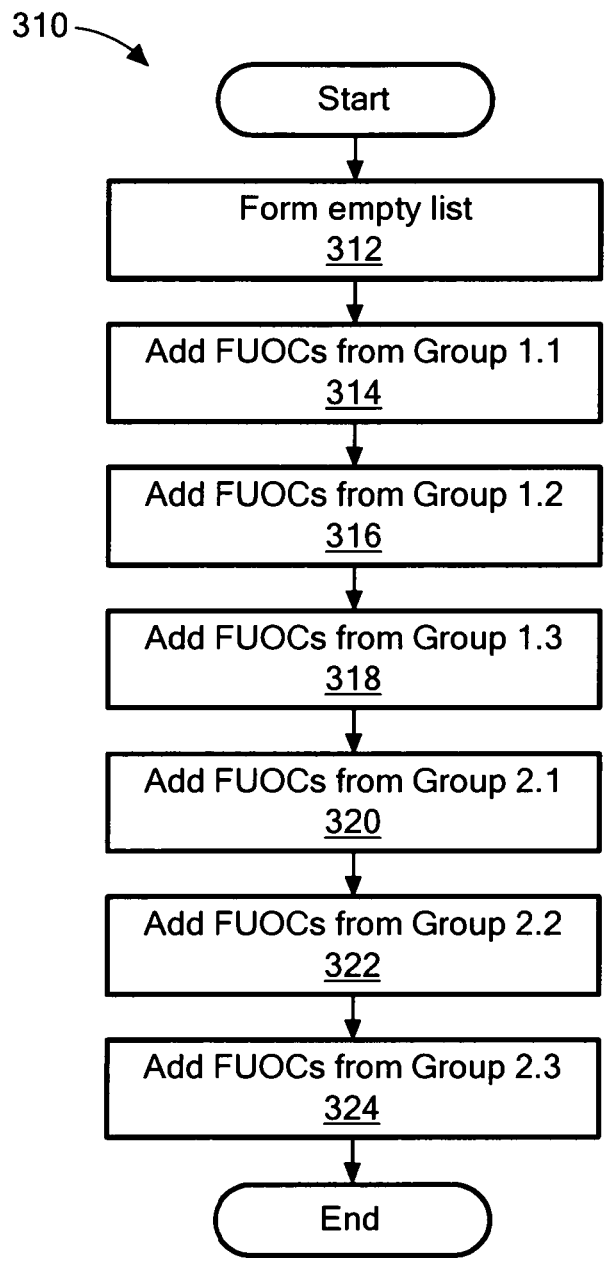
FIG. 18 is flow diagram illustrating processing that may form part of a process which is the same as or similar to the process described in conjunction with FIG. 17.

At block 250, an ordered list of target FUOCs is generated based upon the grouping done at block 248. FIG. 18 shows an illustrative method that may correspond to the processing of block 250.

At block 252, a FUOC channel is selected from the ordered list of FUOCs and, at block 254, the SUOC operates (i.e., a SUOC pair sets up a link such that one SUOC node transmits while another SUOC node receives) in the selected FUOC channel. As discussed above, when the SUOC link is established in a FUOC channel, the FUOC may be impacted. At block 256, a SUOC node can determine the actual impact on the FUOC by analyzing received FUOC signals before and after coexisting. For example, a decision-making unit 214 (FIG. 13) in the SUOC receiver may compare the actual FUOC rate before the SUOC began transmitting in the FUOC's channel to the actual FUOC rate while the SUOC is transmitting; if the FUOC's rate experiences a large drop, it is said that the impact upon the FUOC is high. In another embodiment, a helper SUOC would perform the sensing and estimation of the FUOC's before and/or after coexistence rate. Other techniques for determining actual impact on a FUOC may also be used, to include detection in change of FUOC signal power and/or, when the FUOC's waveform and higher layer specifications are known, reading of the control messages and/or updates to the routing table. Any means to detect waveform parameter changes that are intended to help maintain a reasonable quality of service would be appropriate for use as a detection scheme in unit 214 for alerting the SUOC that the FUOC has been harmed and to the level the harm is estimated (e.g. low impact or high impact harm).

At block 258, a determination is made as to whether the actual impact on the FUOC is acceptable, e.g. by determining whether FUOC communications is disrupted in some way which prevents the FUOC from engaging in reliable communications. The criteria for an "acceptable" impact may be based on one or more user-defined parameters. For example, a rate degradation of less than 10%, 5%, or 2% may be considered acceptable. In some embodiments, the threshold for an acceptable impact may vary based upon the original FUOC rate. If the actual impact on the FUOC is acceptable the SUOC can continue operating in the selected FUOC channel, periodically monitoring its impact on the FUOC (i.e., blocks 254-258 may be repeated). However, if the actual impact on the FUOC is unacceptable, the next FUOC channel in the ordered list can be selected (block 252), and the processing of blocks 254-258 can be repeated as above. The FUOC channel previously tried may be marked as unusable in the ordered list of FUOCs (e.g., the list cursor may be advanced). Thus, the SUOC can iteratively try to find a FUOC to coexist with, starting with FUOCs that can accommodate the SUOC requirements and for which a low expected impact is predicted. This can be repeated until an acceptable FUOC is found, until all FUOCs have been tried, or until some other suitable termination criterion is reached.

In some embodiments, the processing of blocks 248 and 250 is performed by a characterization/prediction unit (e.g., characterization/prediction unit 212 of FIG. 13), whereas the processing of blocks 252, 256, and 258 is performed by a decision-making unit (e.g., decision-making unit 214 of FIG. 13), which controls a configurable radio (e.g., configurable radio 208 of FIG. 13) to transmit and/or receive in selected channels at block 254.

FIGS. 16A-16D are graphs of achievable rate regions for a SUOC received signal in the presence of the FUOC signal, with the horizontal axes corresponding to FUOC rates and the vertical axes corresponding to SUOC rates. The rate regions are defined by an area under a curve (e.g., the area 260 under curve 262 in FIG. 16A) and are shown using hatching in the several figures. The upper bounding lines to this area are the maximum rate that can be achieved by a multiuser detector-enabled SUOC link in the presence of a FUOC interfering signal, as a function of the rate of the FUOC signal. For a given FUOC rate, the rate for SUOC transmission can be chosen to be any point within the rate region along the corresponding FUOC rate line (e.g., rate line 260 in FIG. 16A).

The achievable rate regions shown in FIGS. 16A-16D are based upon the MAC joint rate region derived in S. Verdu, The Capacity Region of the Symbol-Asynchronous Gaussian Multiple-Access Channel. IEEE Trans on Info Theory, Vol. 35, no. 4, July 1989. It will be appreciated that the region of FIGS. 16A-16D may differ from the MAC rate region since the rate regions of FIGS. 16A-16D include rate pairs for which the decoding of the SUOC signal is possible, even if the FUOC signal cannot be successfully decoded. Since the SUOC is not the intended receiver of the FUOC's signal, it does not need to successfully demodulate the FUOC's signal. The region used by the coexistence cognitive radio, then, can be extended to continue beyond that of the join rate region. Specifically, the filters or projections of MMSE-MUD that are focused on the SUOC signal can be used to demodulate the SUOC's signal in the presence of the FUOC's signal, even when the rate of the FUOC's signal would cause the rate pair to fall to the right of the maximum FUOC rate bound in the joint rate region.

Given information about the MUD receivers available in a SUOC receiver and the receivers SNRs of the SUOC and FUOC signals at the SUOC receiver, a SUOC-centric achievable rate region can be generated using known techniques.

The achievable rate regions of FIGS. 16A-16D represent four different coexistence scenarios that can be detected by a cognitive coexistence radio (e.g., a SUOC node). These scenarios can be used to inform a SUOC whether coexisting with a particular FUOC would achieve either the SUOC's "selfish" goal of achieving a desired SUOC rate and/or the SUOC's "altruistic" goal of causing a low impact on the FUOC. A SUOC can use such information to group the FUOC channels and subsequently generate an ordered list of FUOC channels, as described below in conjunction with FIGS. 17 and 18.

Figure 16A:
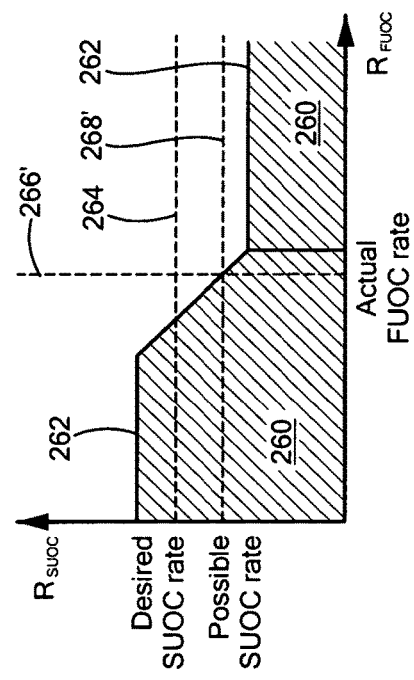
FIGS. 16A-16D are series of graphs showing two-user achievable rate regions.

Referring to FIG. 16A, a two-user achievable rate region 260 is defined as the area under curve 262. A SUOC's desired rate, which may correspond to the desired rate determined at block 262 of FIG. 15, is shown by rate line 264. A FUOC's actual rate, which can be determined as described above in conjunction with block 266 of FIG. 15, is shown by rate line 266. The maximum possible SUOC rate can be determined from the intersection of the FUOC rate line 266 through the curve 262, and is indicated by line 268 in the figure. In this example, the possible SUOC rate is greater than the desired SUOC rate.

Figure 16B:
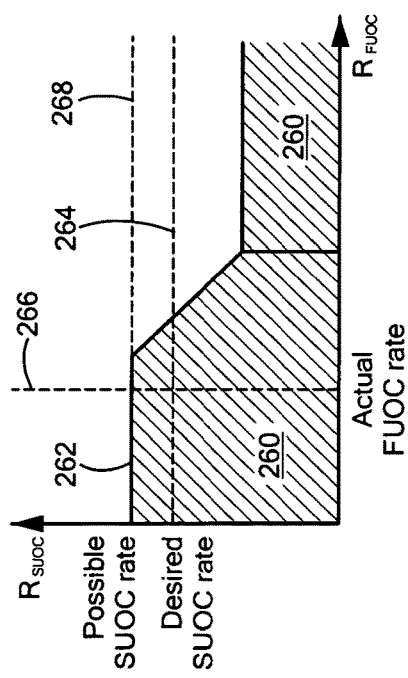

Referring to FIG. 16B, in which like elements of FIG. 16A are shown using like reference designations, an actual FUOC rate is shown by rate line 266' and the corresponding possible SUOC rate, as determined from the intersection of the FUOC rate line 266' and the curve 262, is indicated by line 268'. In this example, the possible SUOC rate is less than the desired SUOC rate.

Figure 16C:
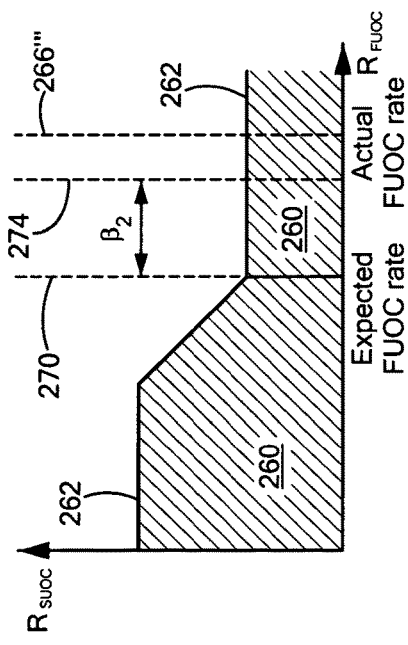

Referring to FIG. 16C, in which like elements of FIGS. 16A and 16B are shown using like reference designations, an actual FUOC rate is shown by rate line 266" and an possible FUOC rate is shown by rate line 270. The possible FUOC rate can be determined in several different ways, as described above in conjunction with FIG. 14A. For example, the possible FUOC rate can be defined in terms of the Shannon channel capacity, an achievable rate, and/or may be based upon predefined lookup tables. In FIG. 16C, the possible FUOC rate corresponds to a maximum FUOC rate achievable in a free-and-clear channel.

As discussed above in conjunction with FIGS. 14A and 14B, a large discrepancy between the actual and possible FUOC rates is a good indicator that the intended receiver (i.e., the FUOC receiver) is located far away far away physically, or just in the path-loss sense, from the FUOC transmitter relative to the SUOC nodes. To quantify what is meant by a "large discrepancy," two design parameters $\beta_1$ and $\beta_2$ can be defined. If the actual FUOC rate is less than the possible FUOC rate less $\beta_1$, it can be assumed (for the purpose of grouping FUOCs) that the SUOC would have a "low" impact on the FUOC if it were to coexist in the FUOC's channel, for the reasons explained above in conjunction with FIG. 16A. Likewise, if the actual FUOC rate is greater than the sum of the possible FUOC rate and $\beta_2$, it can also be assumed that the SUOC would have a "low" impact on the FUOC, for the reasons explained above in conjunction with FIG. 14B. If neither of these conditions is true, it can be assumed that the SUOC would have a "high" impact on the FUOC.

The design parameters $\beta_1$ and $\beta_2$ can be specified in various ways. In some embodiments, these design parameters are pre-determined values that may be stored, hard-coded, or otherwise configured within a radio. In various embodiments, the design parameters $\beta_1$ and $\beta_2$ are computed dynamically. For example, either of both of the design parameters may be a function of the possible FUOC rate. In certain embodiments, a user can specify one or both of the design parameters. In a particular embodiment, the design parameters $\beta_1$ and $\beta_2$ correspond to the same design parameter (i.e., $\beta_1=\beta_2$).

In the example of FIG. 16C, the possible FUOC rate less $\beta_1$ is indicated by line 272. Because the actual FUOC rate is less than this value, it can be assumed that a SUOC would have a "low" impact on the FUOC.

Figure 16D:
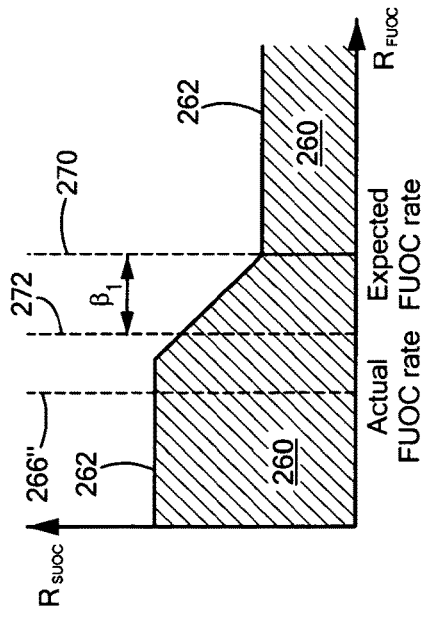

Referring to FIG. 16D, in which like elements of FIGS. 16A-16C are shown using like reference designations, an actual FUOC rate is shown by rate line 266''' and an possible FUOC rate is shown by rate line 270. In this example, the sum of the possible FUOC rate and $\beta_2$ is indicated by line 274. Because the actual FUOC rate is greater than the sum of the possible FUOC rate and $\beta_2$, it can be assumed that a SUOC would have a "low" impact on the FUOC.

Referring to FIG. 17, an illustrative method 280 may correspond to processing performed within a coexistence cognitive radio. In certain embodiments, the method 280 corresponds to the processing performed at block 268 of FIG. 14, whereby the method 280 can be performed once for each target FUOC. The method 280 assigns a given FUOC to one of six (6) possible groups, referred to herein as Group 1.1, Group 1.2, Group 1.3, Group 2.1, Group 2.2, and Group 2.3. It should be understood that the systems, concepts, and techniques sought to be protected herein are not limited to any particular number of groups and that the FUOC-to-group assignments shown in FIG. 17 is merely one example.

At block 282, a two-user achievable rate region is generated, where one of the users corresponds to the FUOC and the other user corresponds to the SUOC. Various examples of such two-user rate regions are shown in FIGS. 16A-16D and described above in conjunction therewith. It should be understood that an actual graphical representation of a rate region need not be generated, but rather any suitable model or other representation of a two-user achievable rate region could be generated or otherwise provided.

At block 284, an actual FUOC rate and an possible FUOC rate are determined using known signal parameters (e.g., the signal parameters determined at block 246 of FIG. 15). The possible FUOC rate can be determined in several different ways, as described above in conjunction with FIG. 14A.

At block 285, a possible SUOC rate is determined. The possible SUOC rate may be determined using the achievable rate region (from block 282) and the actual FUOC rate (from block 284), as described above in conjunction with FIGS. 16A and 16B.

At block 286, it is determined whether the possible SUOC rate (from block 285) is greater than or equal to the desired SUOC rate (from block 242 of FIG. 15). If it is possible to achieve the desired SUOC rate, processing proceeds to blocks 288-296, wherein the FUOC is assigned to one of Group 1.1, Group 1.2, or Group 1.3. Otherwise, if it is not possible to achieve the desired SUOC rate, processing proceeds to blocks 298-306, wherein the FUOC is assigned to one of Group 2.1, Group 2.2, or Group 2.3. It should be appreciated that the first scenario is illustrated in FIG. 16A and the second scenario is illustrated in FIG. 16B.

At block 288 and 298, if the actual FUOC rate is less than the difference of the possible FUOC rate and the design parameter $\beta_1$, the FUOC is assigned to Group 1.1 or Group 2.1 respectively (as shown by blocks 290 and 300). This is the scenario illustrated in FIG. 16C.

At block 292 and 302, if the actual FUOC rate is greater than the sum of the possible FUOC rate and the design parameter $\beta_2$, the FUOC is assigned to Group 1.2 or Group 2.2 respectively (as shown by blocks 294 and 304). This is the scenario illustrated in FIG. 16D.

If none the expected "low impact" scenarios are detected, the FUOC is assigned to either Group 1.3 or Group 2.3, as indicated by blocks 296 and 306, respectively.

It should be appreciated that FUOCs assigned to Groups 1.1 and 1.2 satisfy both the "selfish" and "altruistic" SUOC goals, FUOCs assigned to Group 1.3 satisfy the "selfish" goal but not the "altruistic" goal, FUOCs assigned to Groups 2.1 and 2.2 satisfy the "altruistic" goal but not the "selfish" goal, and FUOCs assigned to Group 2.3 do not satisfy either goal.

Referring to FIG. 18, an illustrative method 310 may correspond to processing performed within a coexistence cognitive radio. In certain embodiments, the method 310 corresponds to the processing performed at block 250 of FIG. 14. The method 310 illustrates one way to generate an ordered list of FUOCS based upon a FUOC grouping, such as the six (6) groups described above in conjunction with FIG. 18.

At block 312, an empty list is formed. The list can be implemented using any suitable data structure, including, but not limited to, a linked list, a doubly linked list, a queue, an array, and a vector. At block 2004, FUOCs from Group 1.1 are added to the empty list. At block 316, FUOCs from Group 1.2 are added to the list after FUOCs from Group 1.1. At block 381, FUOCs from Group 1.3 are added to the list after FUOCs from Group 1.2. At block 320, FUOCs from Group 2.1 are added to the list after FUOCs from Group 1.3. At block 322, FUOCs from Group 2.2 are added to the list after FUOCs from Group 2.1. At block 324, FUOCs from Group 2.3 are added to the end of the list.

It will be appreciated that the illustrative method 310 generates an ordered list of FUOCS that begins with FUOCs that satisfy both the "selfish" and the "altruistic" goals and ends with FUOCs that satisfy neither the "selfish" nor the "altruistic" goals. Thus, this method uses a "selfish and do-no-harm when possible" strategy. If an application favors a "do-no-harm" strategy, the following ordering may be used: Group 1.1, Group 1.2, Group 2.1, Group 2.2, Group 1.3, and Group 2.3. Any other suitable ordering may be used.

Having described preferred embodiments of the concepts sought to be protected, it will now become apparent to those of ordinary skill in the art that other embodiments incorporating these concepts may be used. Accordingly, it is submitted that the scope of protection should not be limited to the described embodiments, but rather should be limited only by the spirit and scope of the appended claims.

The invention claimed is:

1. In a radio network having a plurality of first users on channel (FUOCs) and one or more second users on channel (SUOCs), a method comprising:
   (a) identifying a plurality of FUOCs, each of the plurality of FUOCs operating in a respective FUOC channel;

(b) for each of the plurality of FUOCs, determining if the SUOC can achieve a desired SUOC rate co-existing in the FUOC's channel;

(c) for each of the plurality of FUOCs, determining an expected degradation of performance of the FUOC caused by interference if the SUOC were to co-exist in the FUOC's channel;

(d) assigning each one of the FUOCs to one of a plurality of groups based, at least in part, upon whether the SUOC can achieve the desired SUOC rate co-existing in the FUOC's channel and the expected degradation of performance of the FUOC caused by interference if the SUOC were to co-exist in the FUOC's channel;

(e) generating an ordered list of FUOCs from the plurality of groups; and (f) selecting a FUOC from the ordered list of FUOCs.

2. The method of claim 1 further comprising:

(g) operating in the selected FUOC's channel;

(h) determining an actual impact on a selected FUOC in response to operating in the selected FUOC's channel;

(i) determining if the actual impact on the selected FUOC is acceptable; and (j) if the actual impact on the selected FUOC is not acceptable, selecting another FUOC from the ordered list.

3. The method of claim 1 wherein determining the expected degradation of performance of the FUOC caused by interference if the SUOC were to co-exist in the FUOC's channel comprises:

determining an actual FUOC rate and a possible FUOC rate; and comparing the actual FUOC rate to the possible FUOC rate.

4. The method of claim 3 wherein determining if the SUOC can achieve a desired SUOC rate co-existing in the FUOC's channel comprises:

determining a desired SUOC rate;

determine a possible SUOC rate based upon the actual FUOC rate; and comparing the desired SUOC rate to the possible SUOC rate.

5. The method of claim 4 wherein assigning each one of the FUOCs to one of a plurality of groups comprises assigning each one of the FUOCs to one of a plurality of groups based upon the desired SUOC rate, the possible SUOC rate, the actual FUOC rate, and the possible FUOC rate.

6. The method of claim 5 wherein assigning each one of the FUOCs to one of the plurality of groups comprises:

assigning a FUOC to a first group if a possible SUOC rate is greater than a desired SUOC rate; and assigning a FUOC to a second group if the possible SUOC rate less than the desired SUOC rate.

7. The method of claim 5 wherein assigning each one of the FUOCs to one of the plurality of groups comprises:

assigning a FUOC to a first group if a possible SUOC rate is greater than a desired SUOC rate and if an actual FUOC rate is less than the difference of a possible FUOC rate and a first design parameter;

assigning a FUOC to a second group if the possible SUOC rate is greater than the desired SUOC rate and if the actual FUOC rate is greater than the sum of the possible FUOC rate and a second design parameter;

assigning a FUOC to a third group if the possible SUOC rate is greater than the desired SUOC rate, and if the actual FUOC rate is not less than less than the difference of a possible FUOC rate and a first design parameter, and if the actual FUOC rate is not greater than the sum of the possible FUOC rate and a second design parameter;

assigning a FUOC to a fourth group if the possible SUOC rate is less than the desired SUOC rate and if the actual FUOC rate is less than the difference of the possible FUOC rate and a first design parameter;

assigning a FUOC to a fifth group if the possible SUOC rate is less than the desired SUOC rate and if the actual FUOC rate is greater than the sum of the possible FUOC rate and a second design parameter; and assigning a FUOC to a sixth group if the possible SUOC rate is less than the desired SUOC rate, and if the actual FUOC rate is not less than less than the difference of a possible FUOC rate and a first design parameter, and if the actual FUOC rate is not greater than the sum of the possible FUOC rate and a second design parameter.

8. The method of claim 7 wherein generating an ordered list of FUOCs from a plurality of groups comprises:

forming a list;

adding FUOCs from the first group to the beginning of the list;

adding FUOCs from the second group to the list, after FUOCs from the first group;

adding FUOCs from the third group to the list, after FUOCs from the second group;

adding FUOCs from the fourth group to the list, after FUOCs from the third group;

adding FUOCs from the fifth group to the list, after FUOCs from the fourth group; and adding FUOCs from the sixth group to the list, after FUOCs from the fifth group.

9. The method of claim 7 wherein generating an ordered list of FUOCs from a plurality of groups comprises:

forming a list;

adding FUOCs from the first group to the beginning of the list;

adding FUOCs from the second group to the list, after FUOCs from the first group;

adding FUOCs from the fourth group to the list, after FUOCs from the second group;

adding FUOCs from the fifth group to the list, after FUOCs from the fourth group;

adding FUOCs from the third group to the list, after FUOCs from the fifth group; and adding FUOCs from the sixth group to the list, after FUOCs from the third group.

10. The method of claim 1 wherein determining an actual FUOC rate and a possible FUOC rate comprises:

receiving radio frequency (RF) signals transmitted by a FUOC;

analyzing the received RF signals to determine signal parameters, the signal parameters including a received signal power and an actual FUOC rate; and deriving a possible FUOC rate based, at least in part, upon the received signal power and the actual FUOC rate.

11. A system in a network having one or more first users on a channel (FUOCs) and one or more second users on a channel (SUOCs), the system comprising:

a radio configured to:

(a) identify a plurality of FUOCs, each of the plurality of FUOCs operating in a respective FUOC channel;

(b) for each of the plurality of FUOCs, determine if the SUOC can achieve a desired SUOC rate co-existing in the FUOC's channel;

(c) for each of the plurality of FUOCs, determine an expected degradation of performance of the FUOC caused by interference if the SUOC were to co-exist in the FUOC's channel;
(d) assign each one of the FUOCs to one of a plurality of groups based, at least in part, upon whether the SUOC can achieve the desired SUOC rate co-existing in the FUOC's channel and the expected degradation of performance of the FUOC caused by interference if the SUOC were to co-exist in the FUOC's channel;
(e) generate an ordered list of FUOCs from the plurality of groups; and
(f) select a FUOC from the ordered list of FUOCs.

* * * * *